INVENTORS
CARL A. NAPOR
CHARLES G. KRUMM
WILLIAM T. ENGEL
BY
Norman N Holland
ATTORNEY

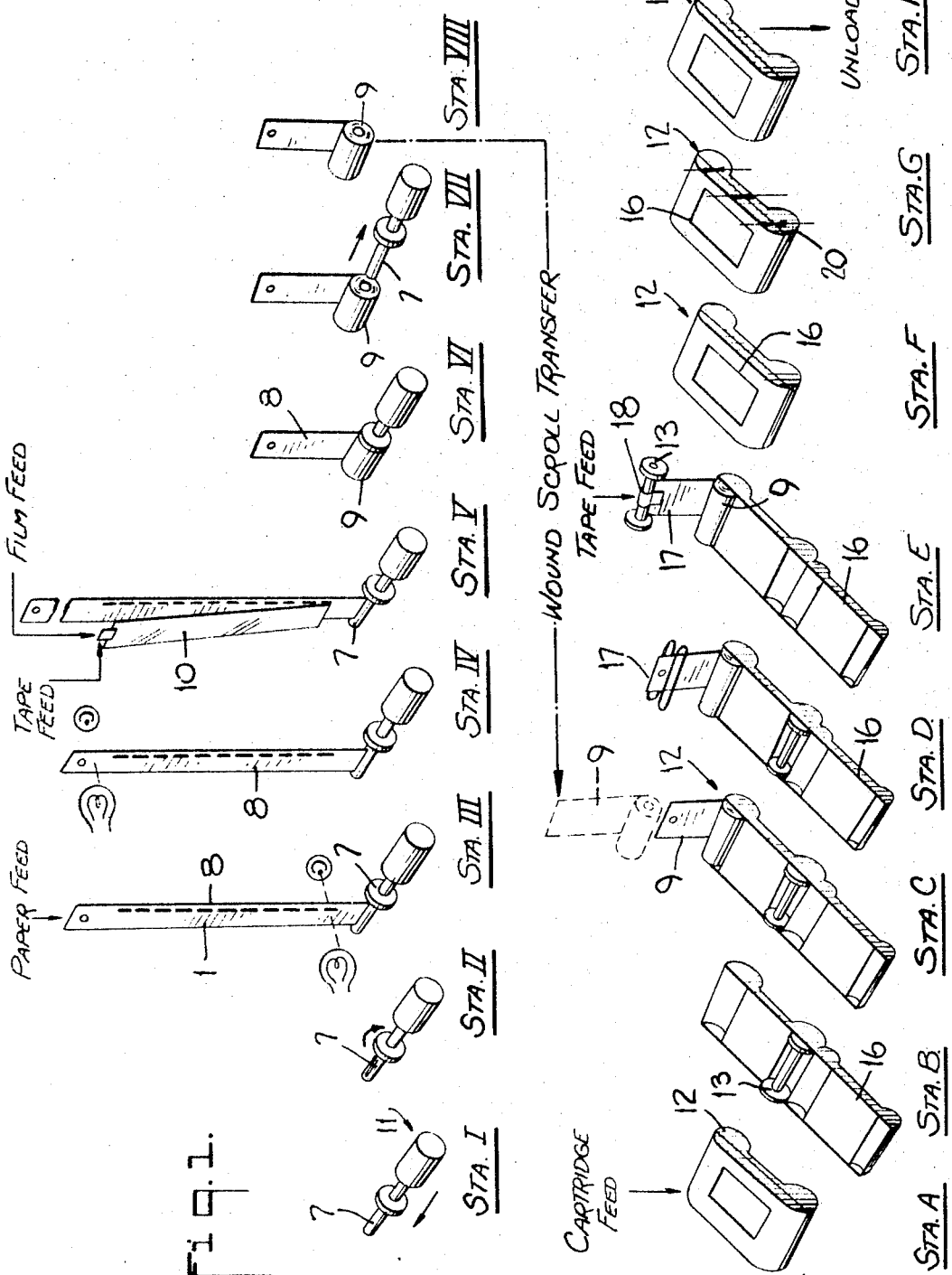

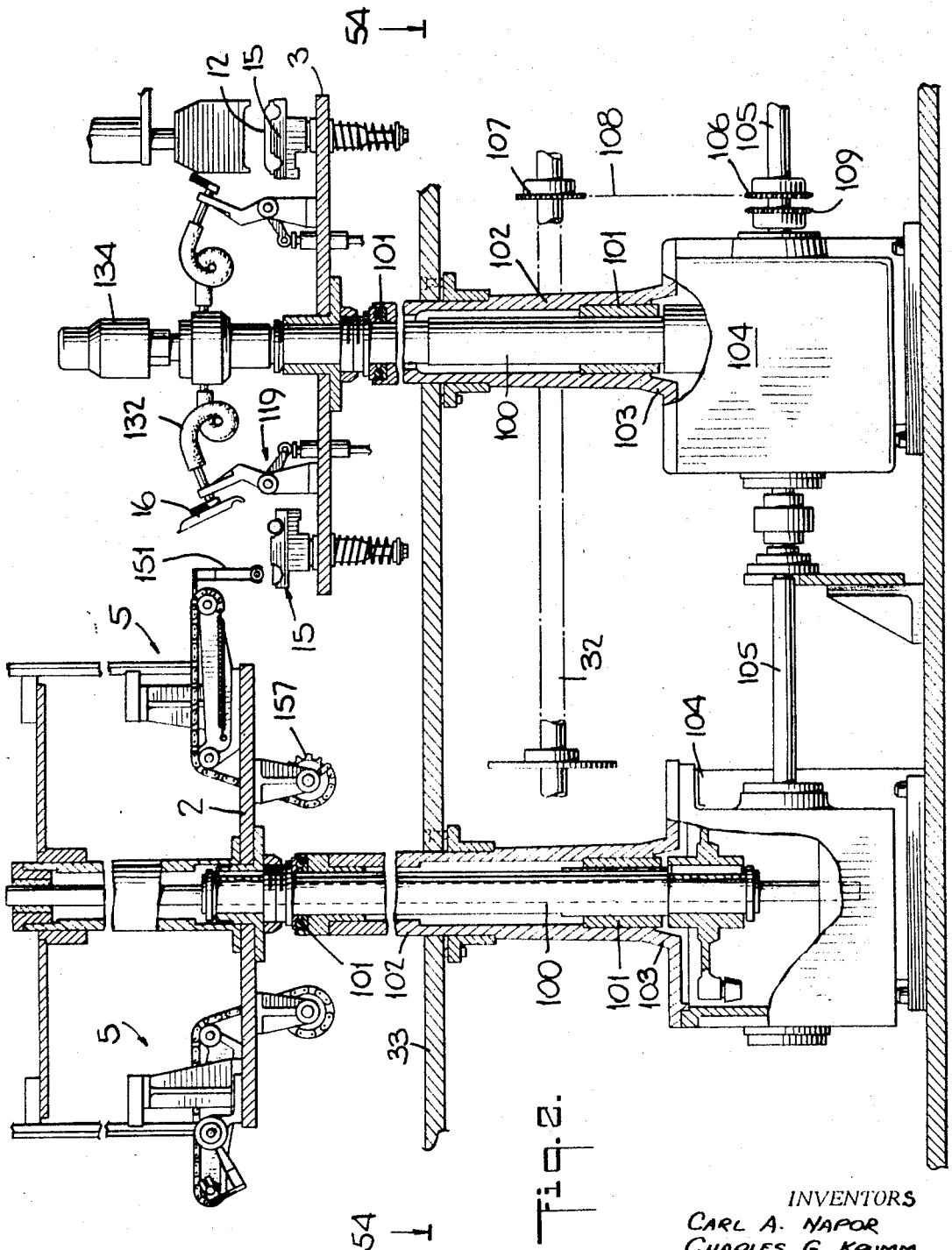

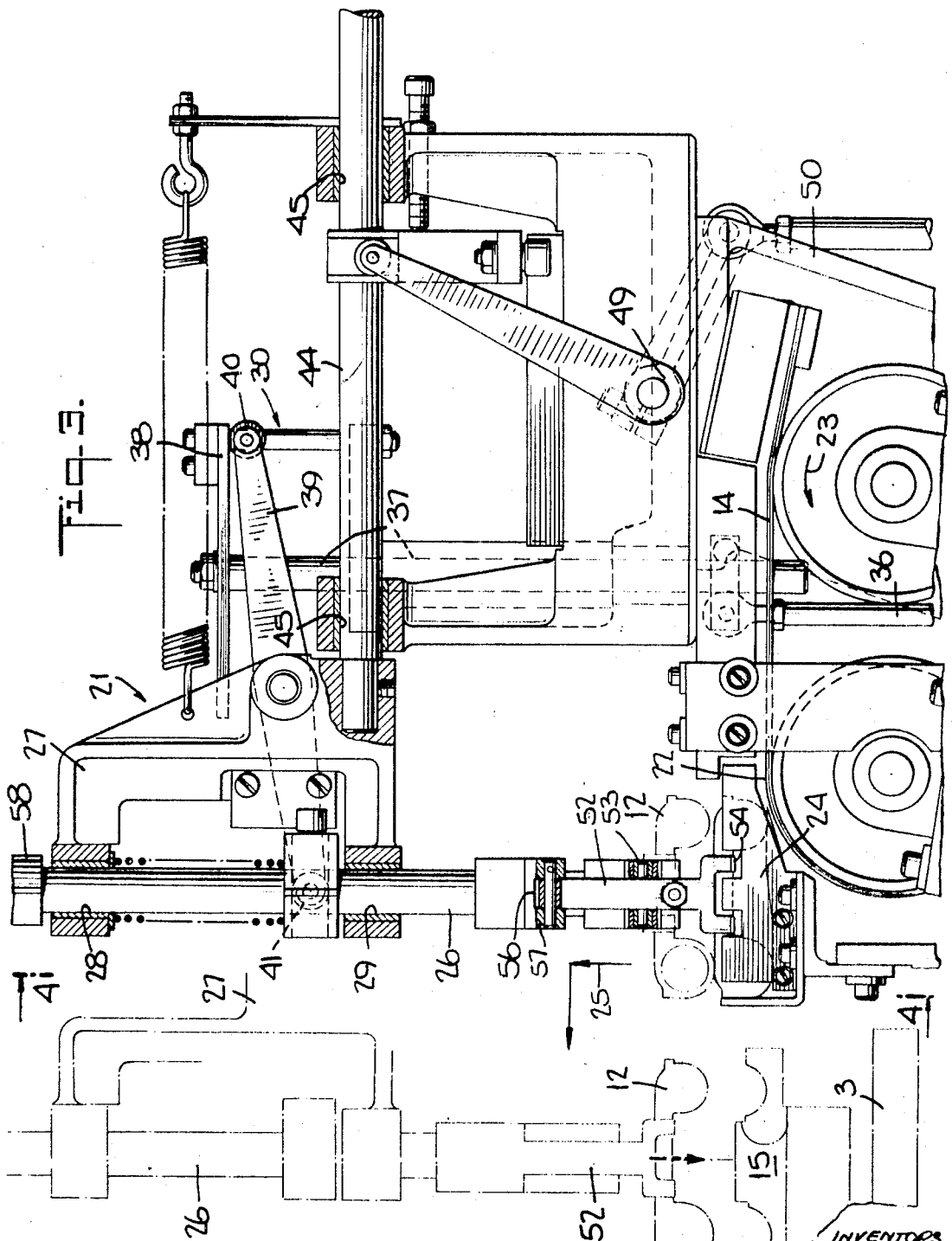

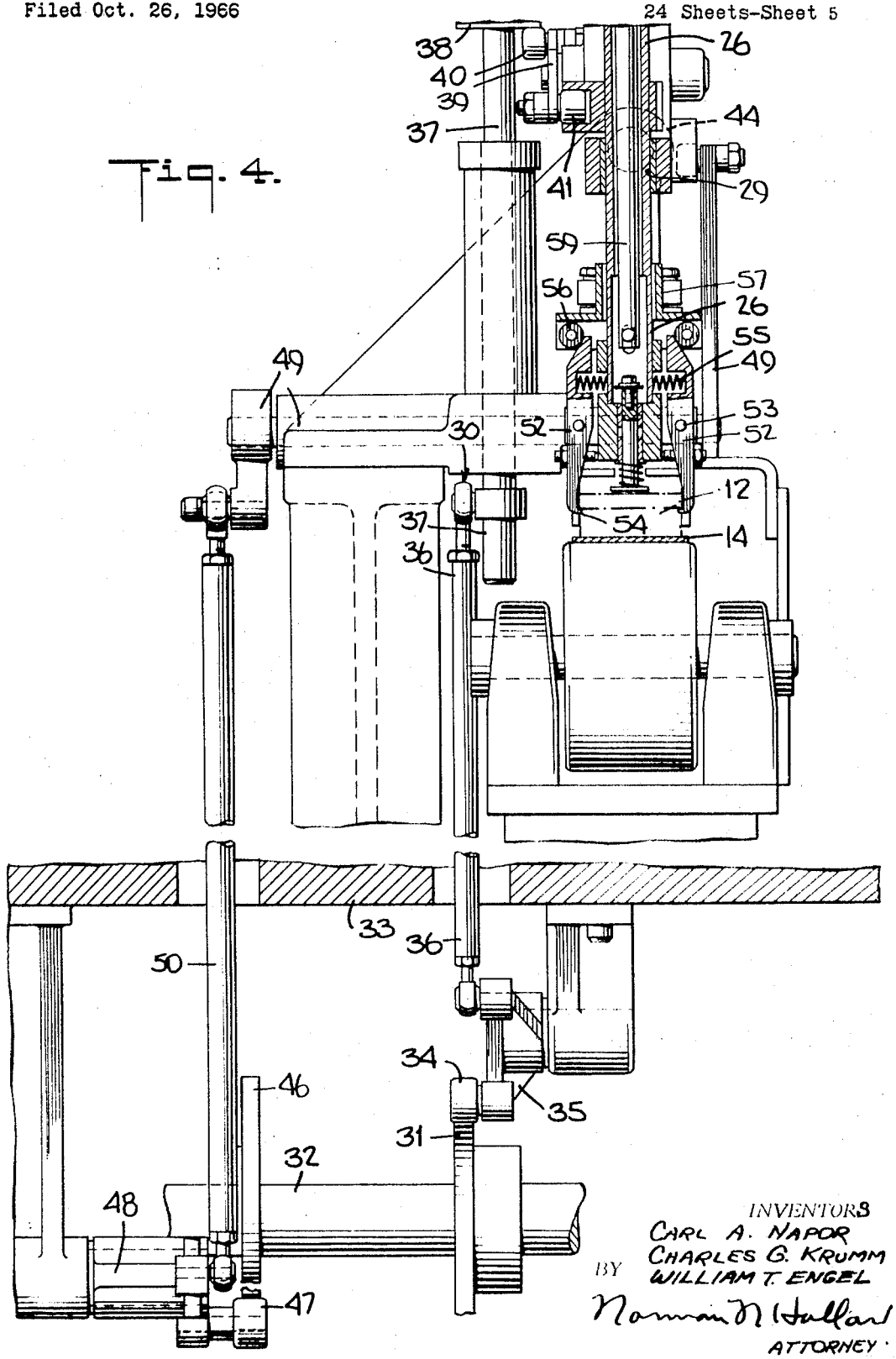

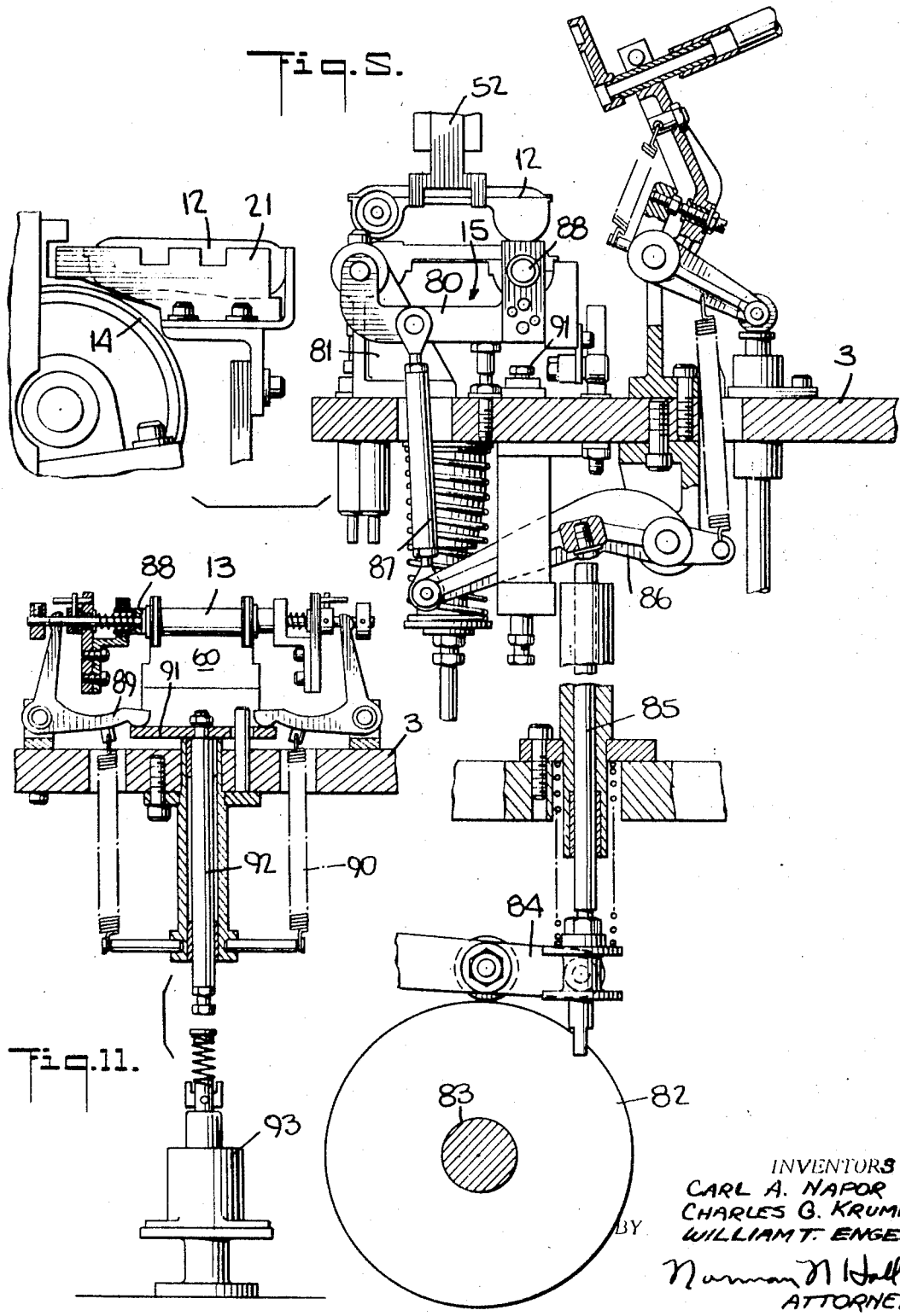

INVENTORS
CARL A. NAPOR
CHARLES G. KRUMM
WILLIAM T. ENGEL
ATTORNEY

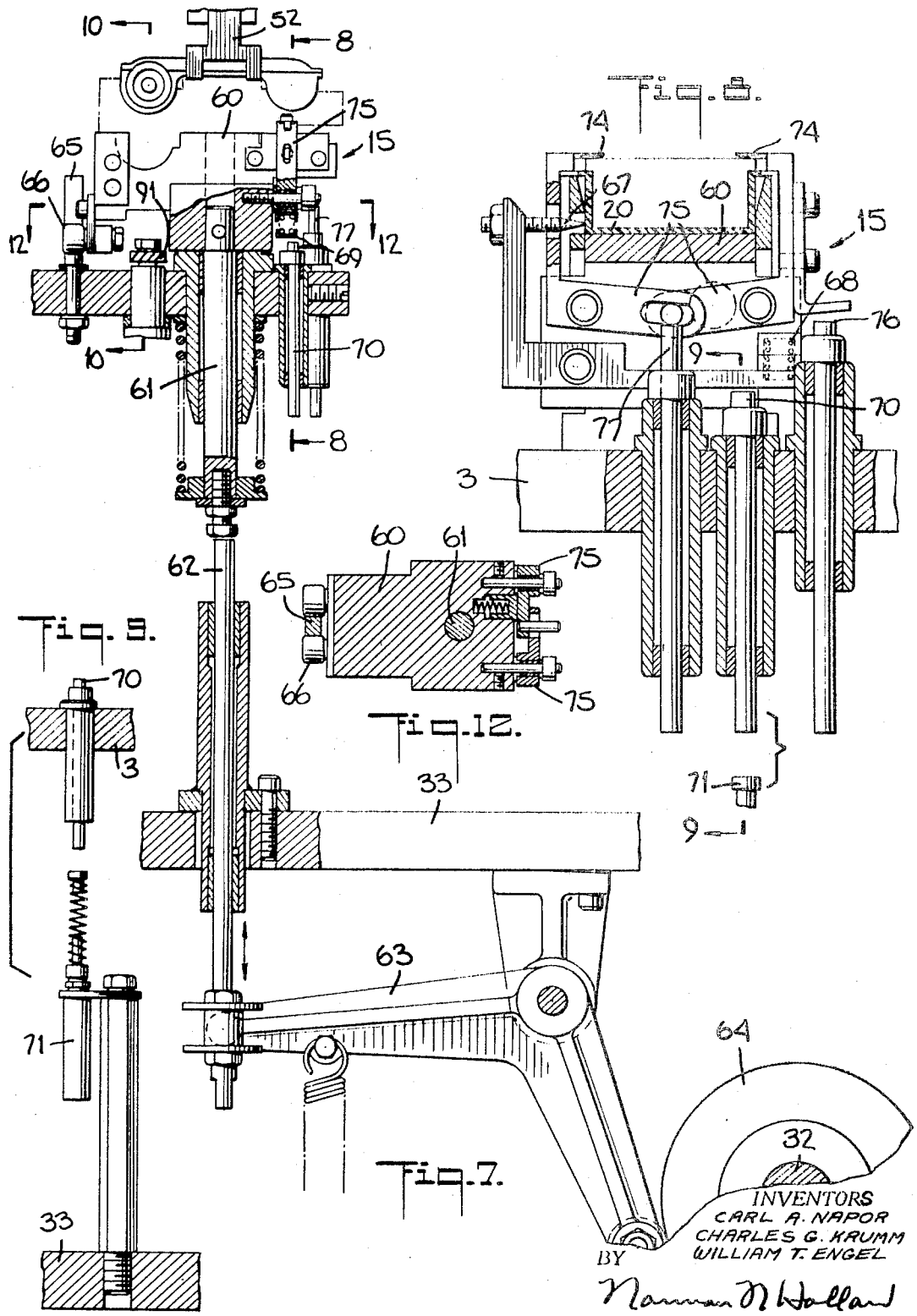

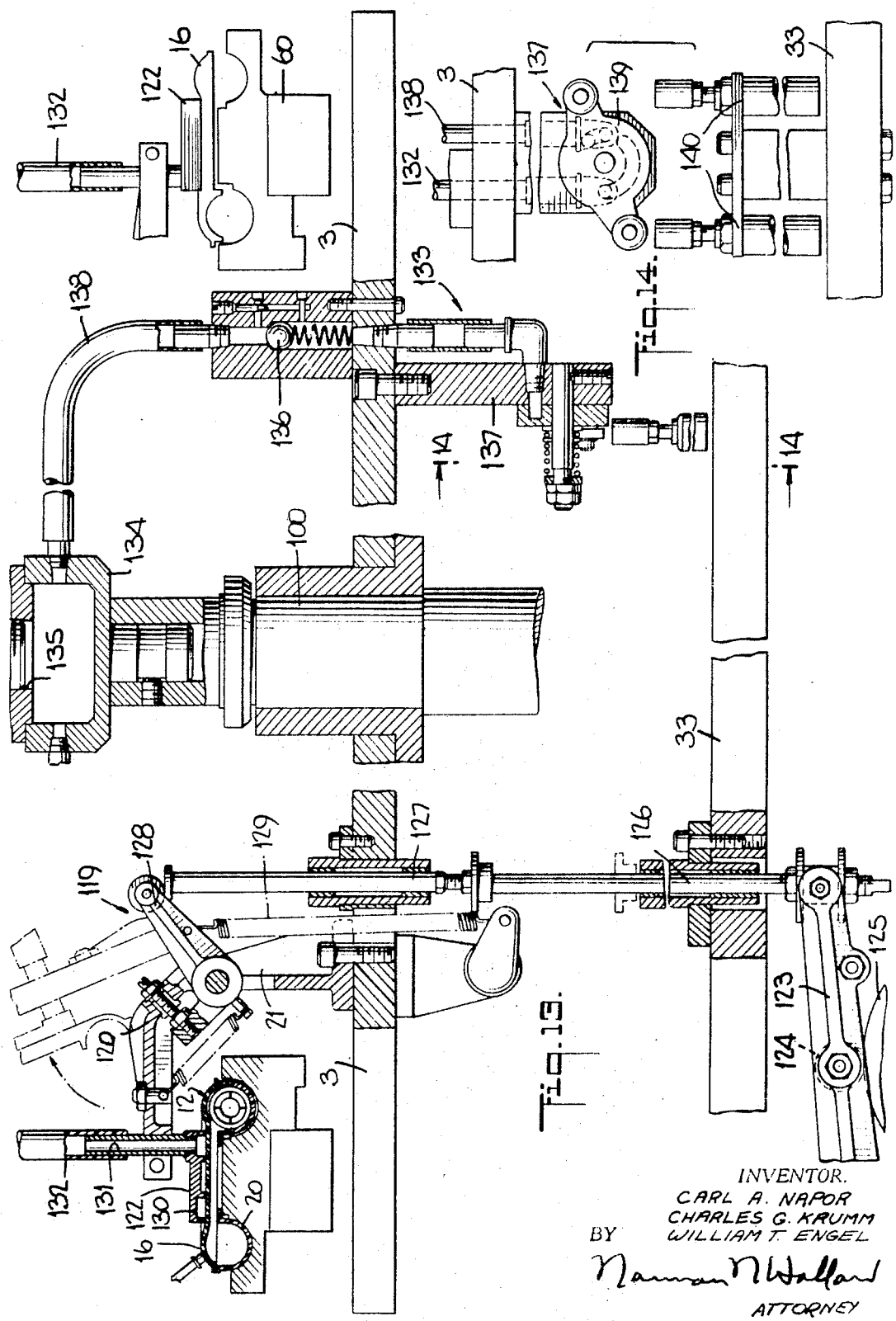

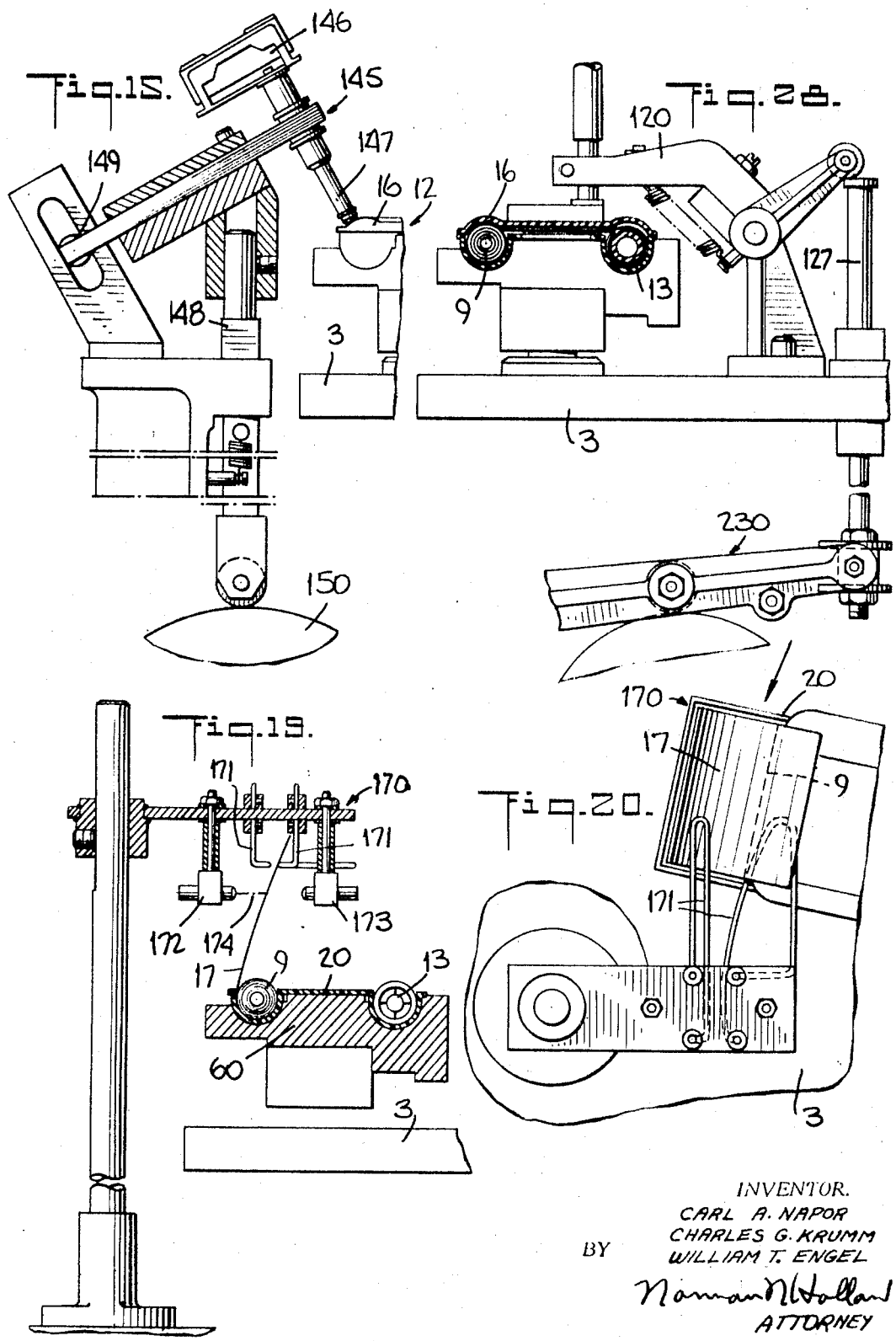

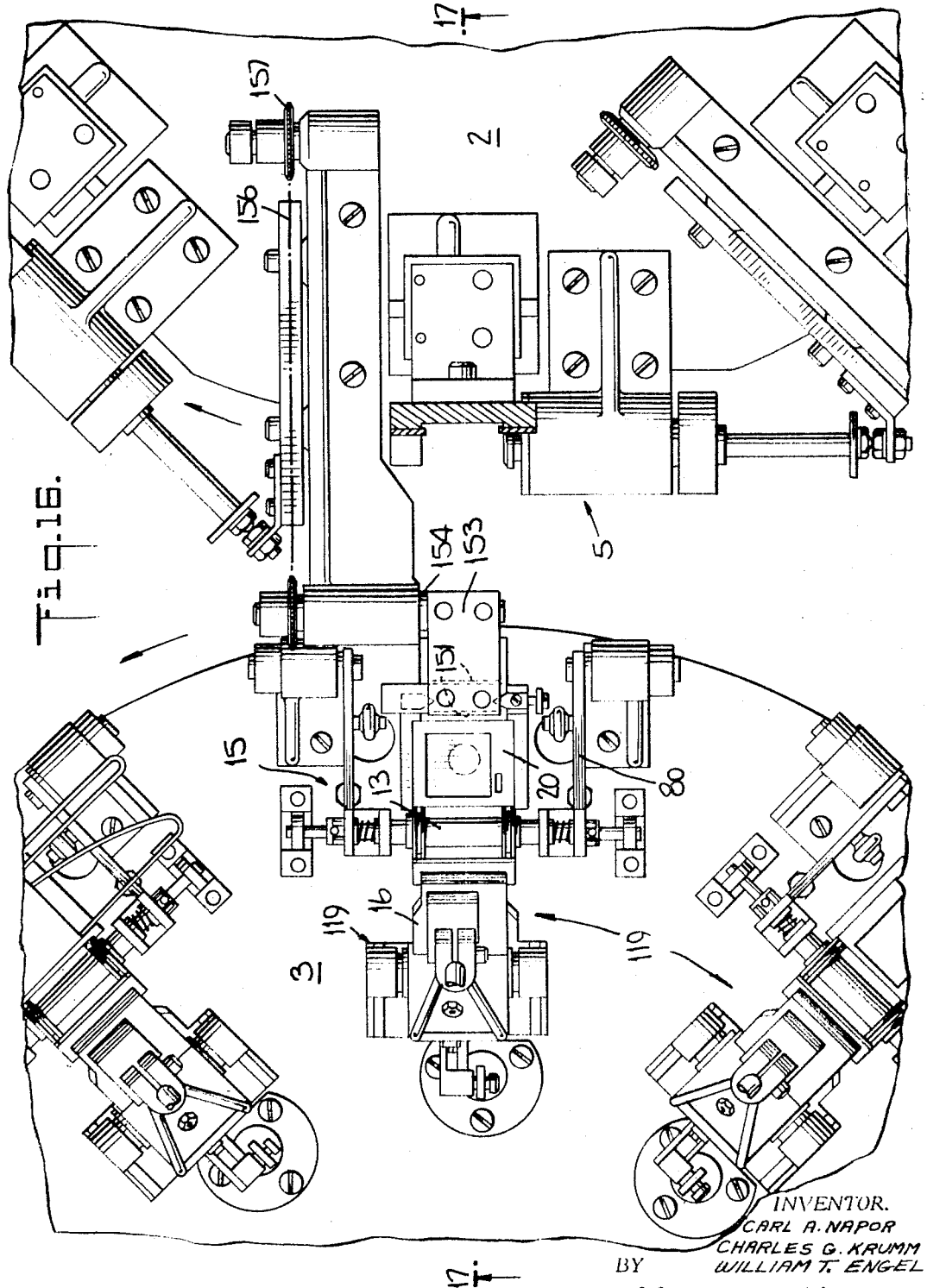

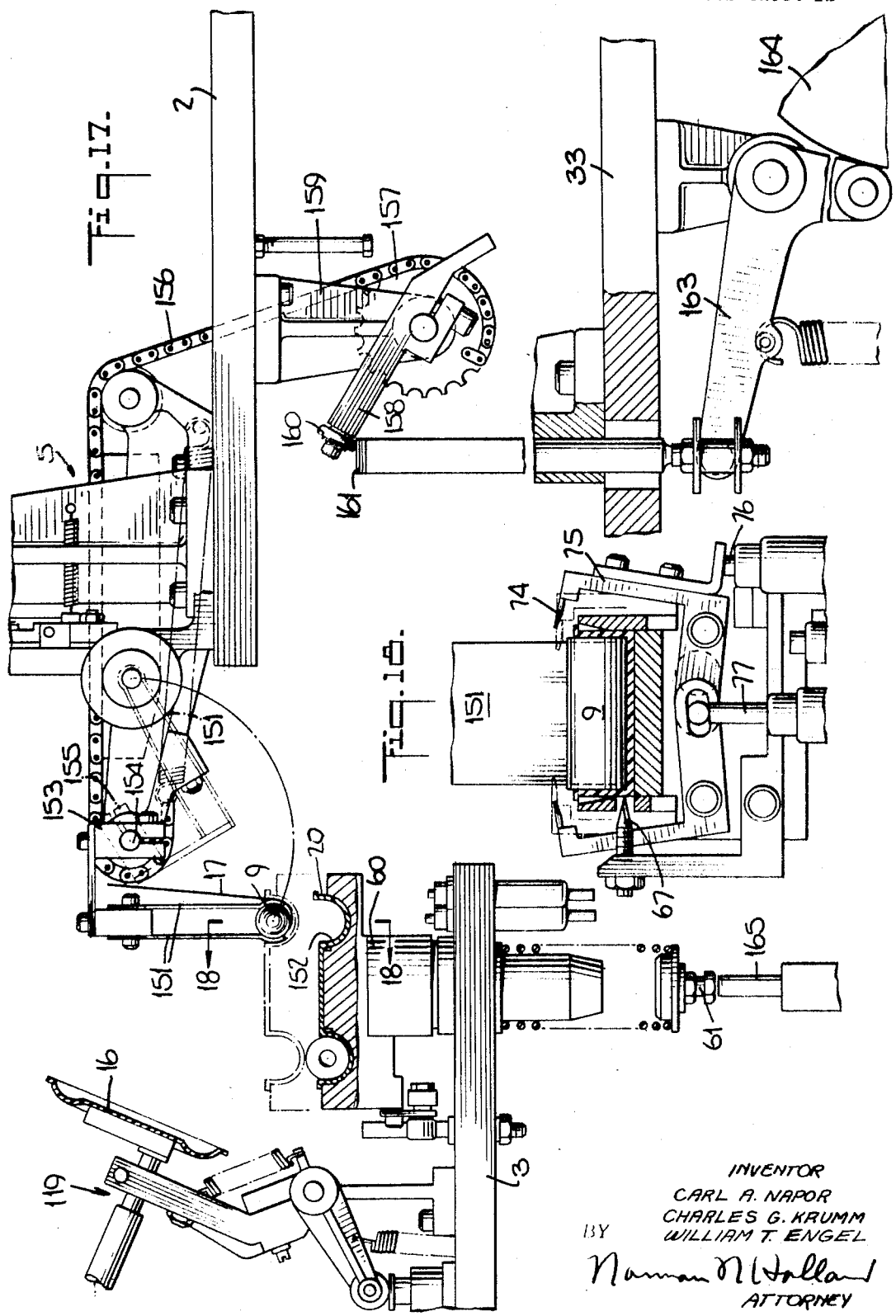

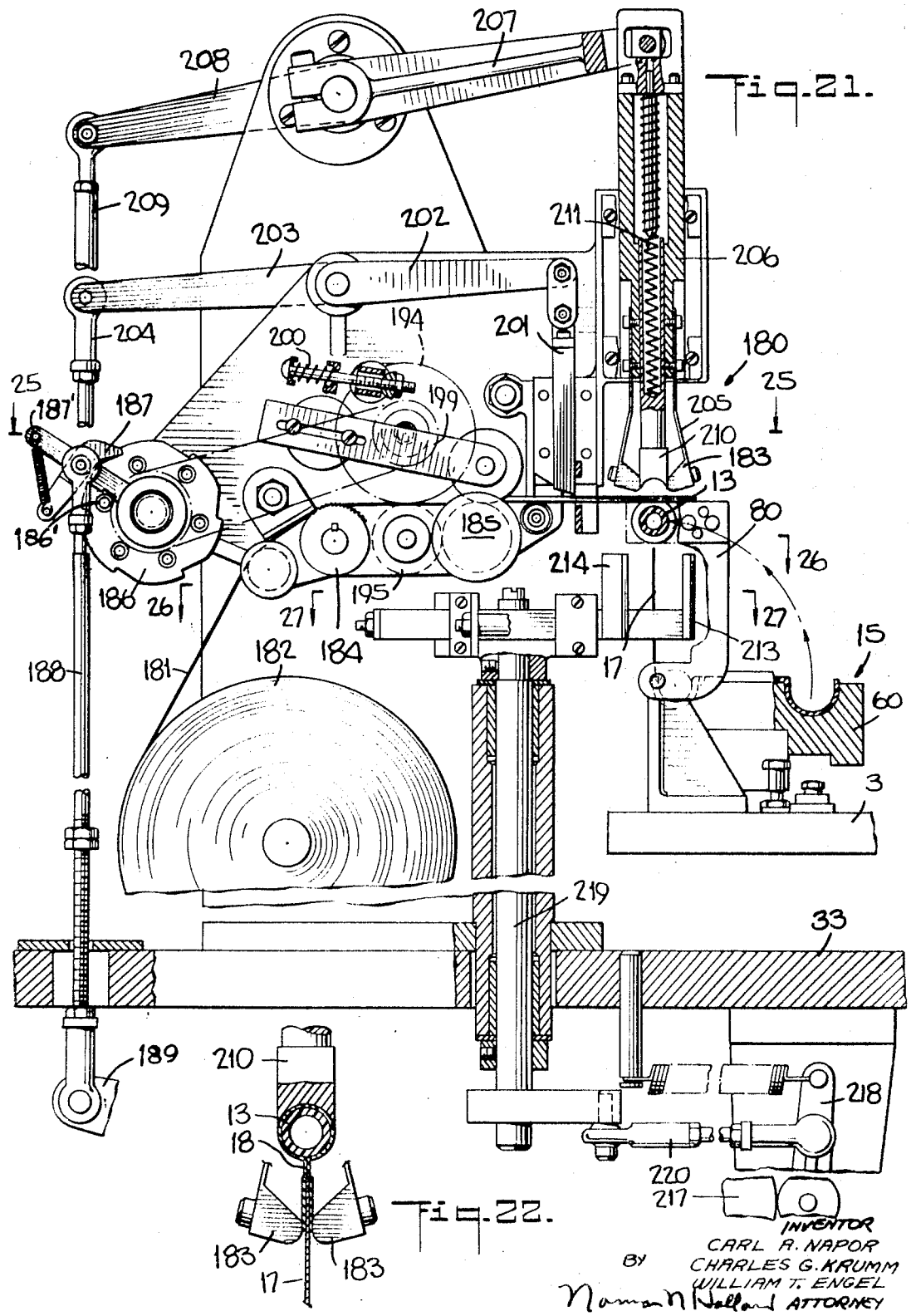

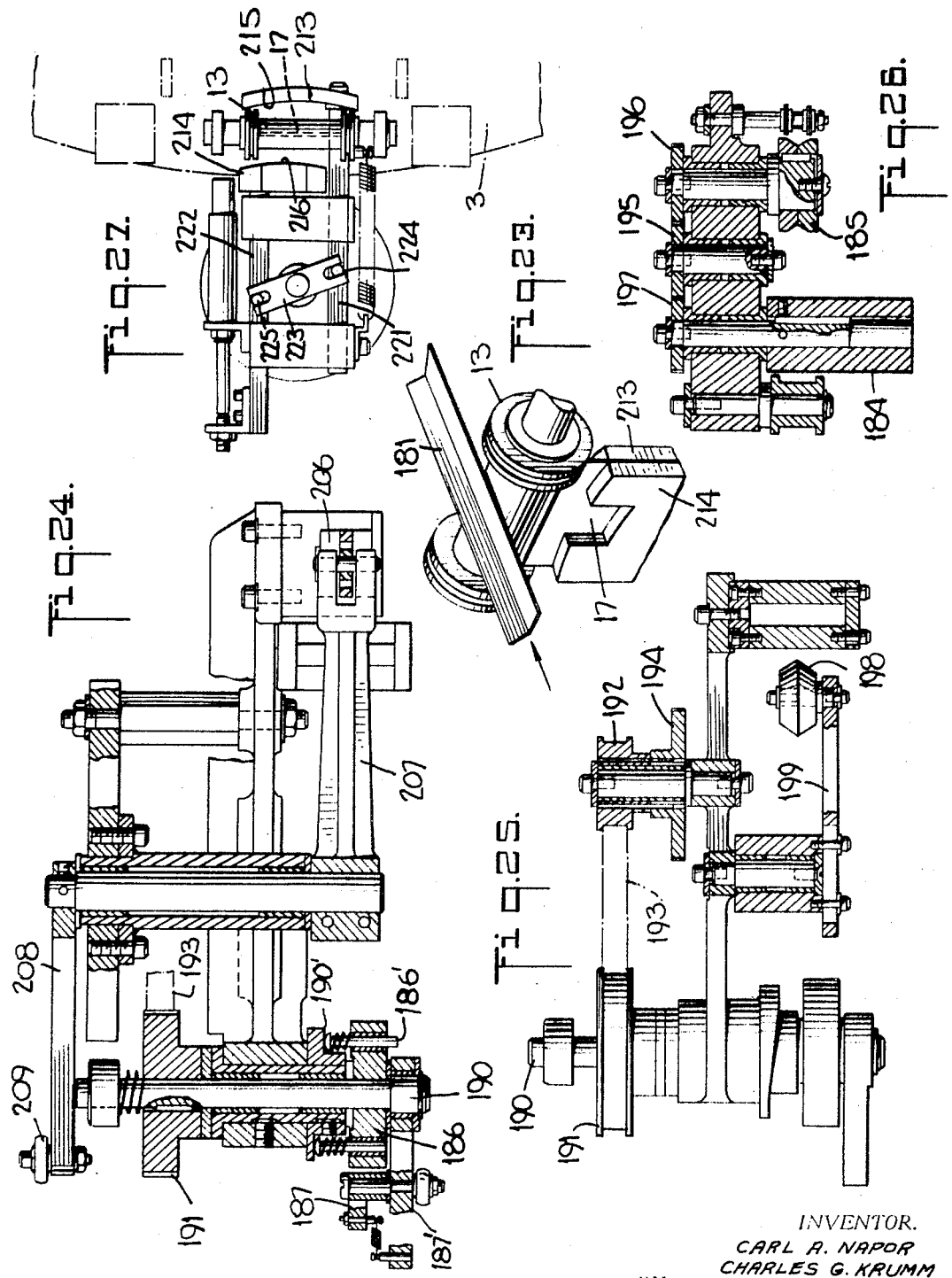

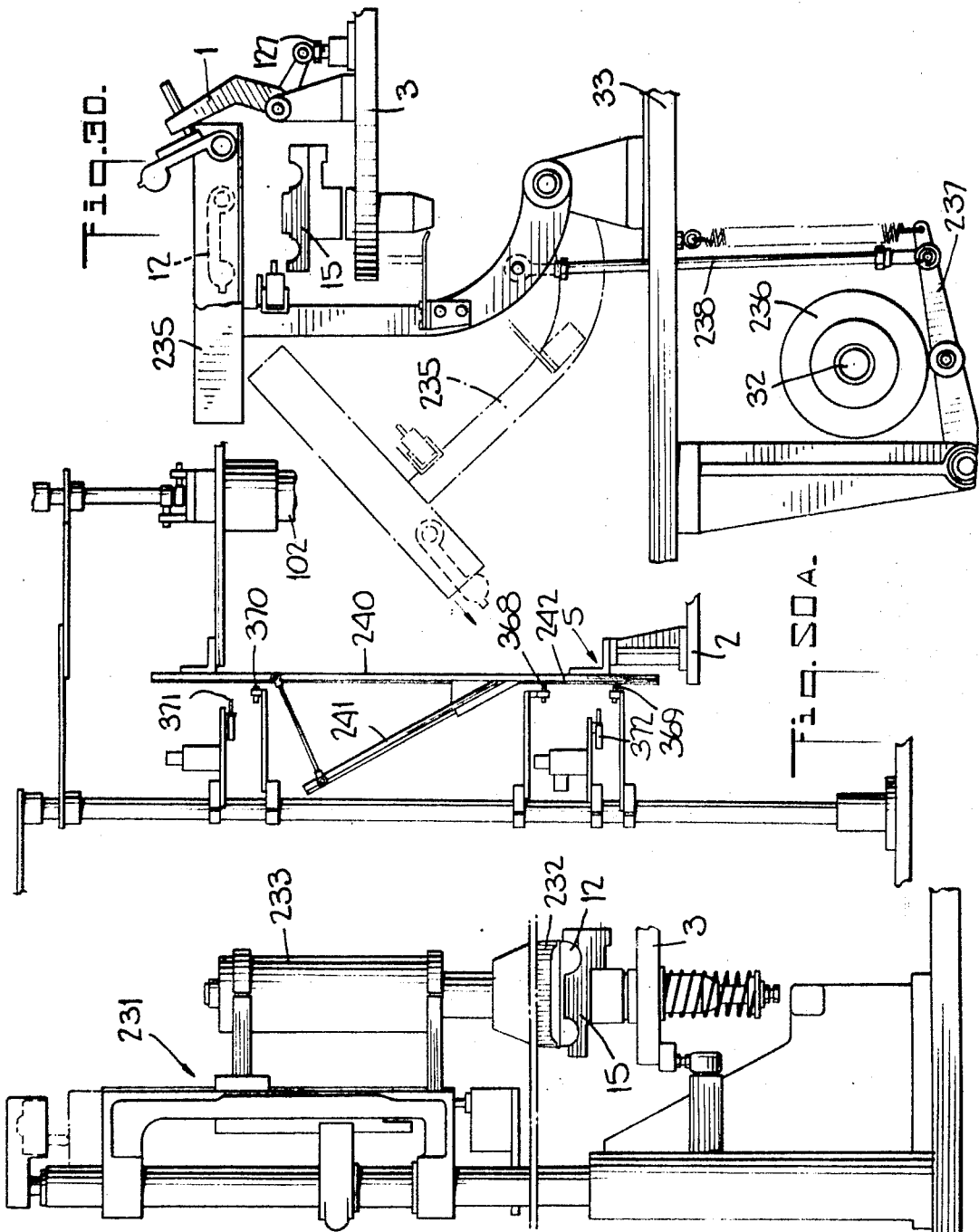

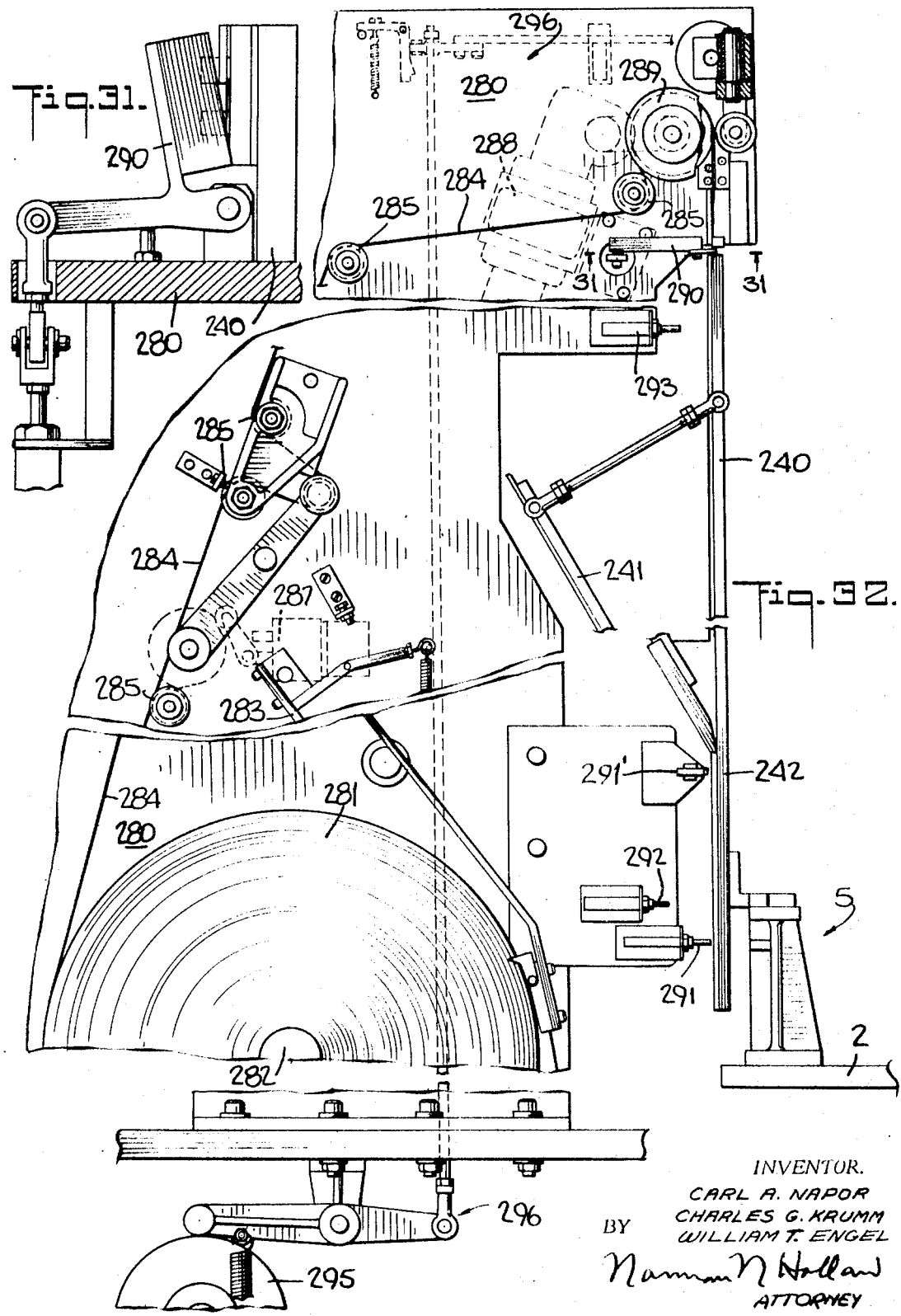

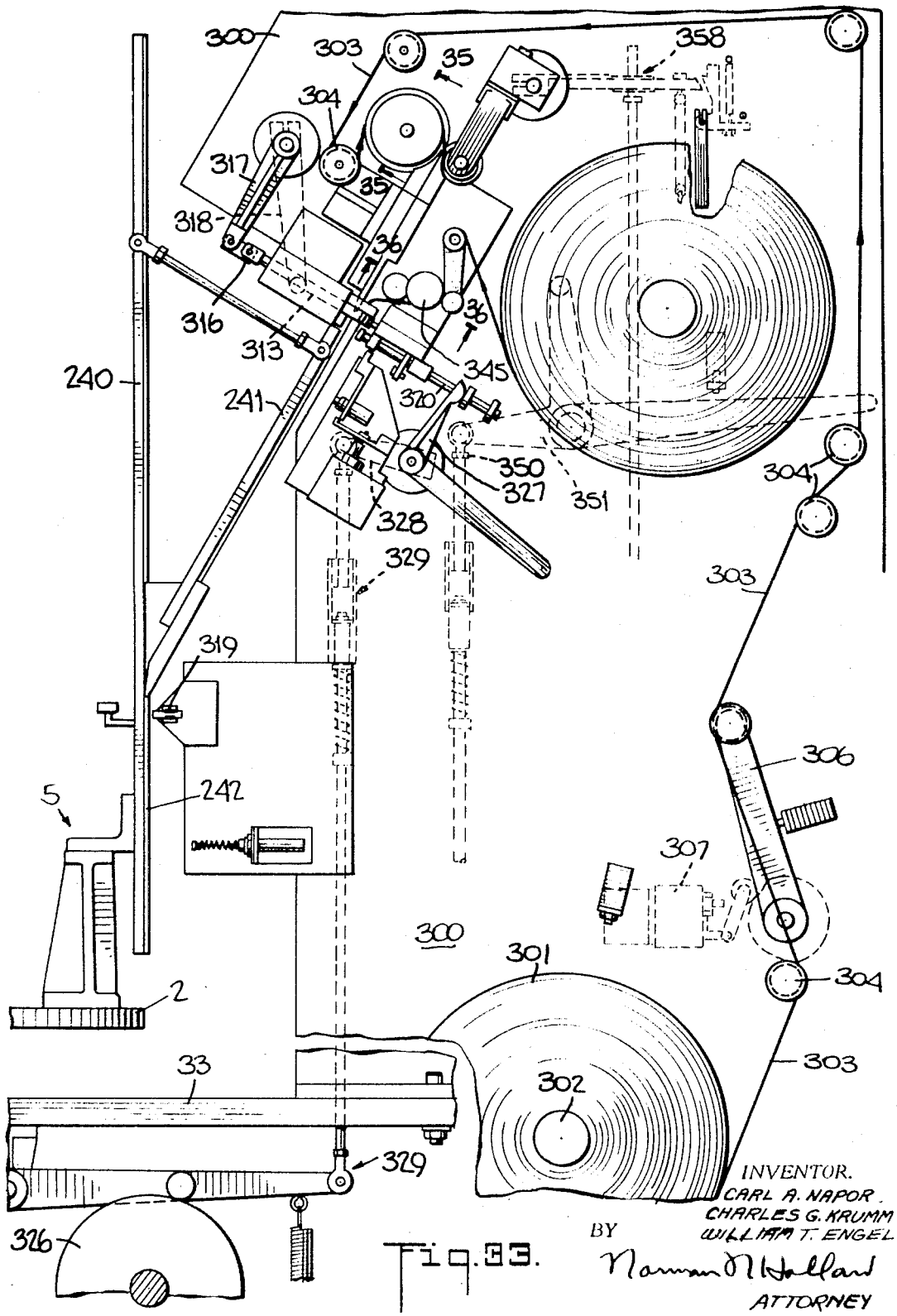

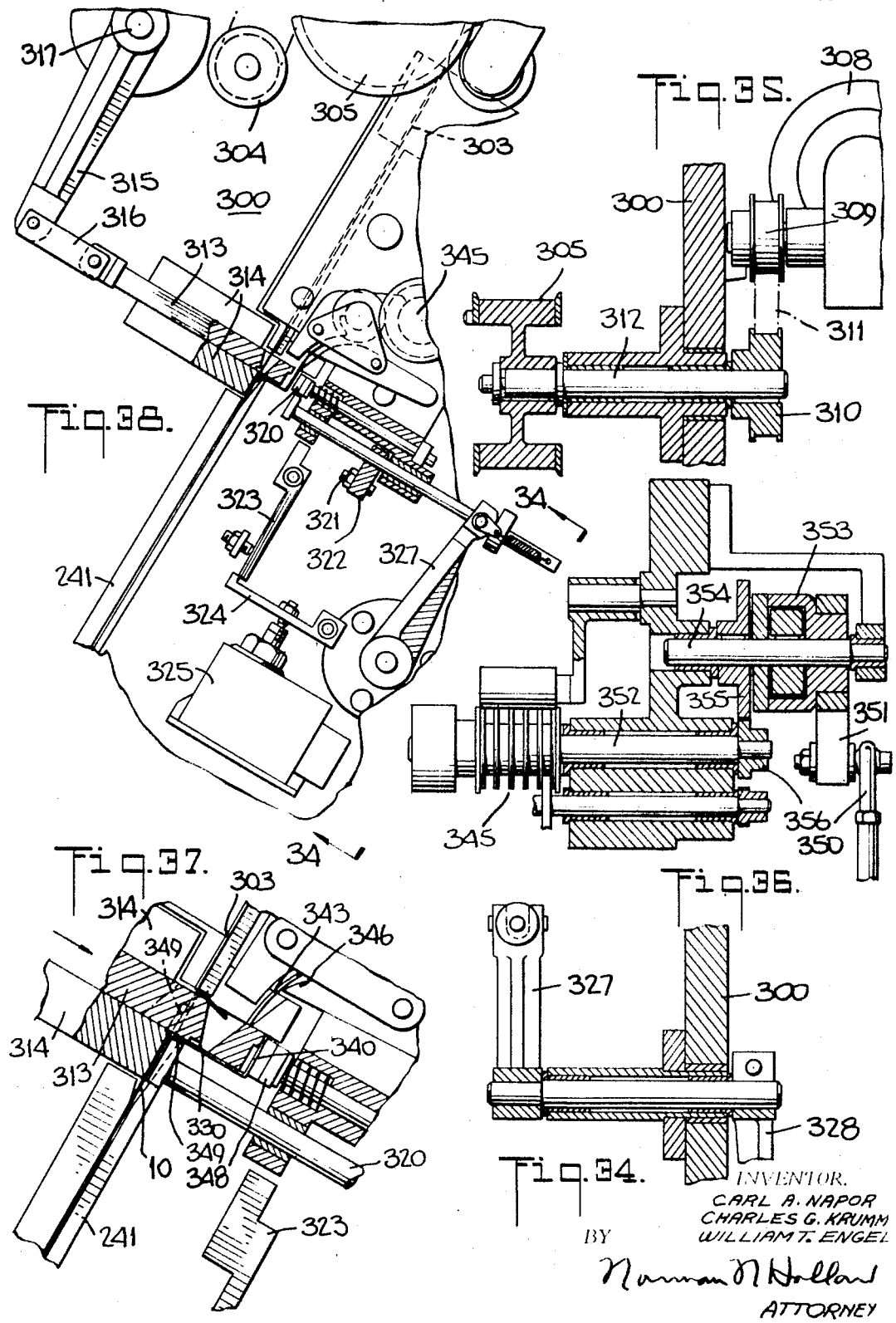

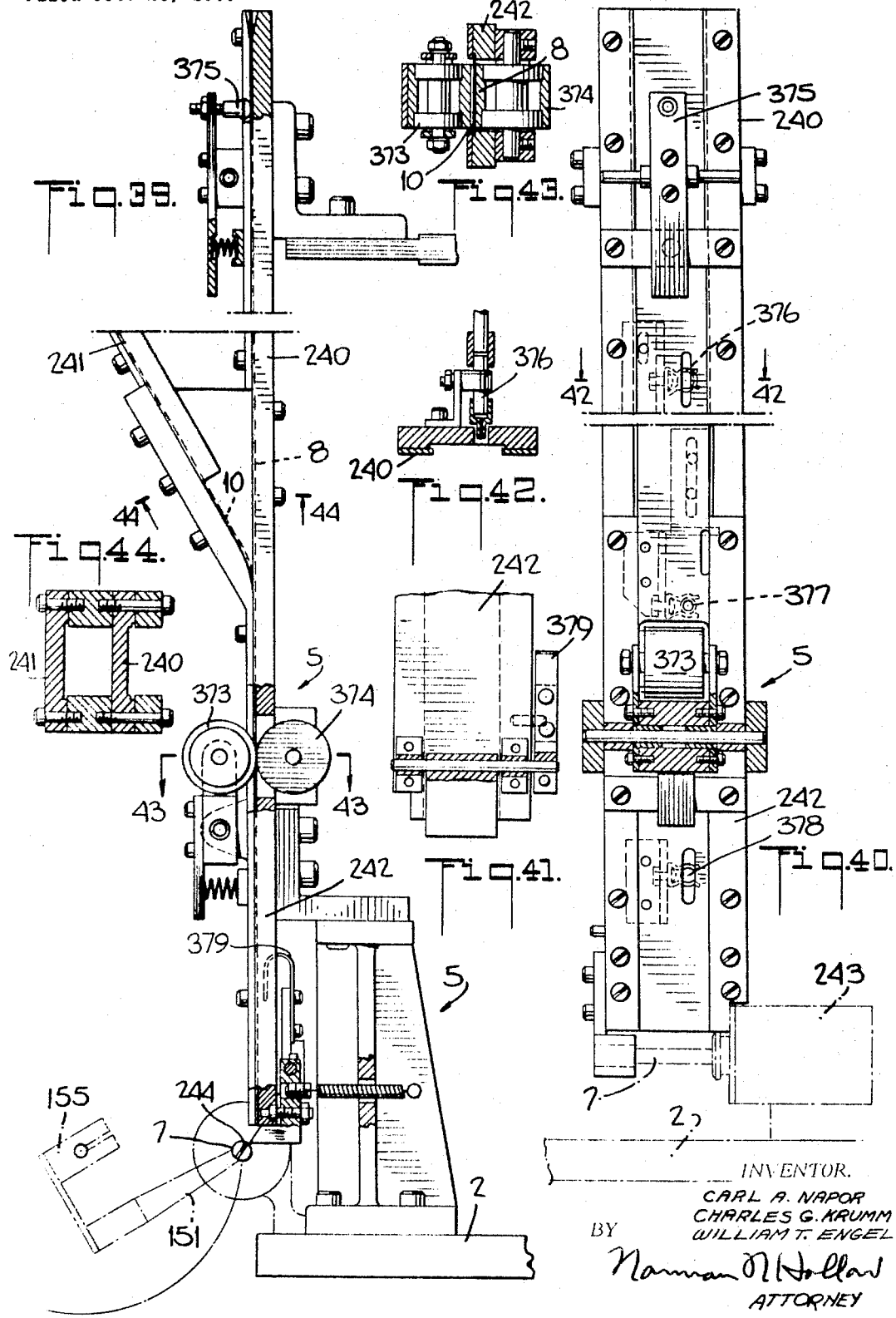

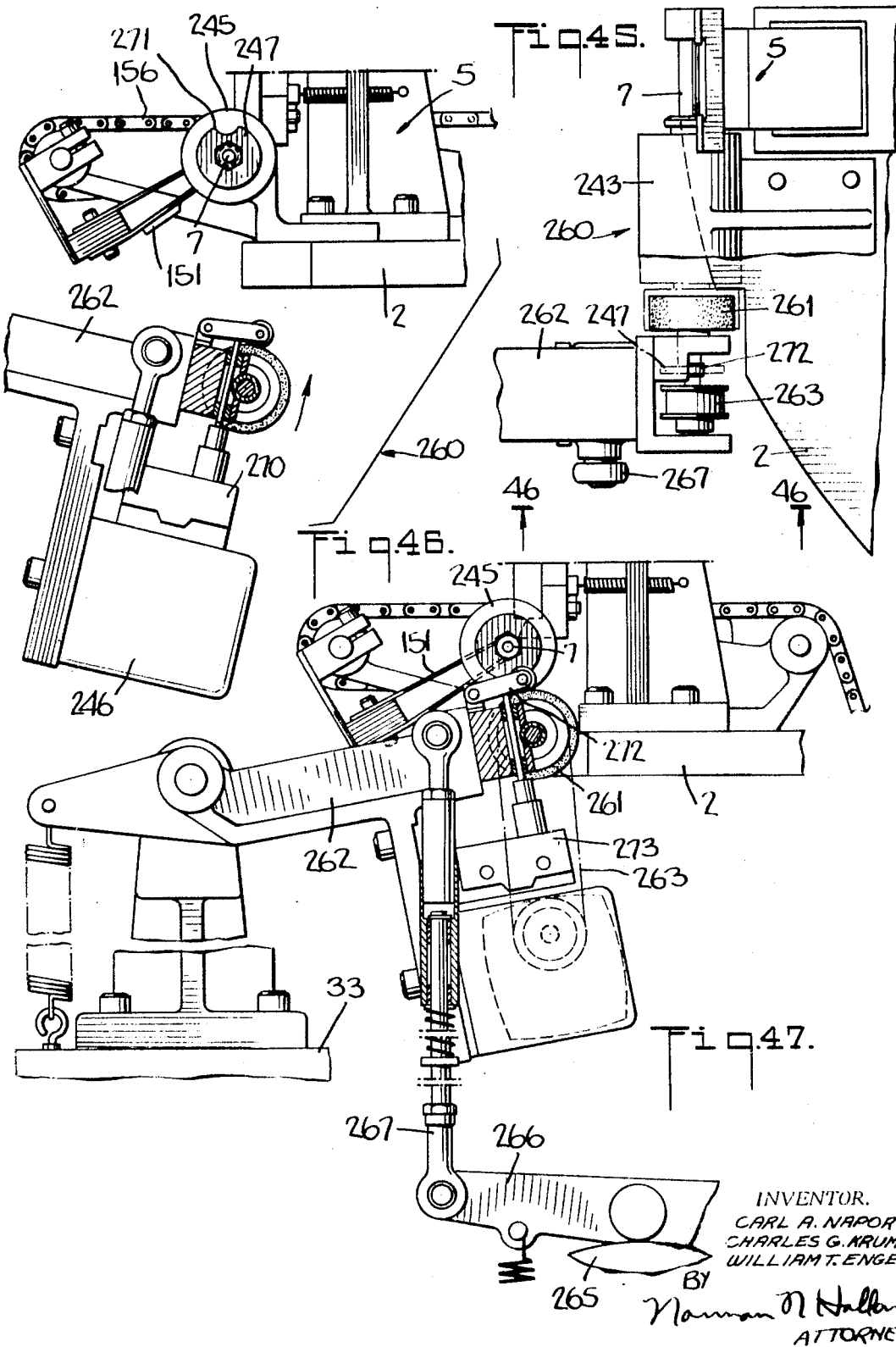

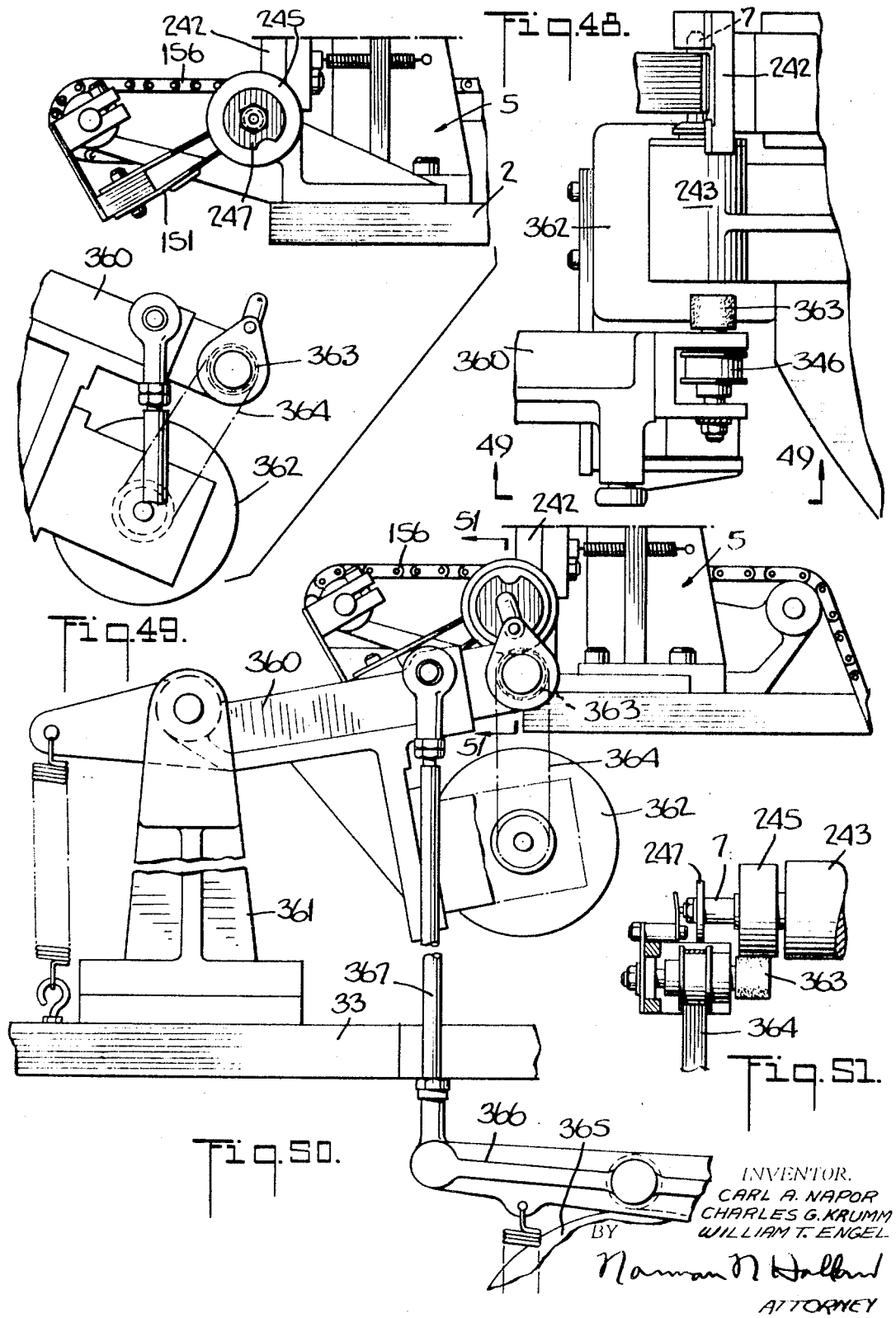

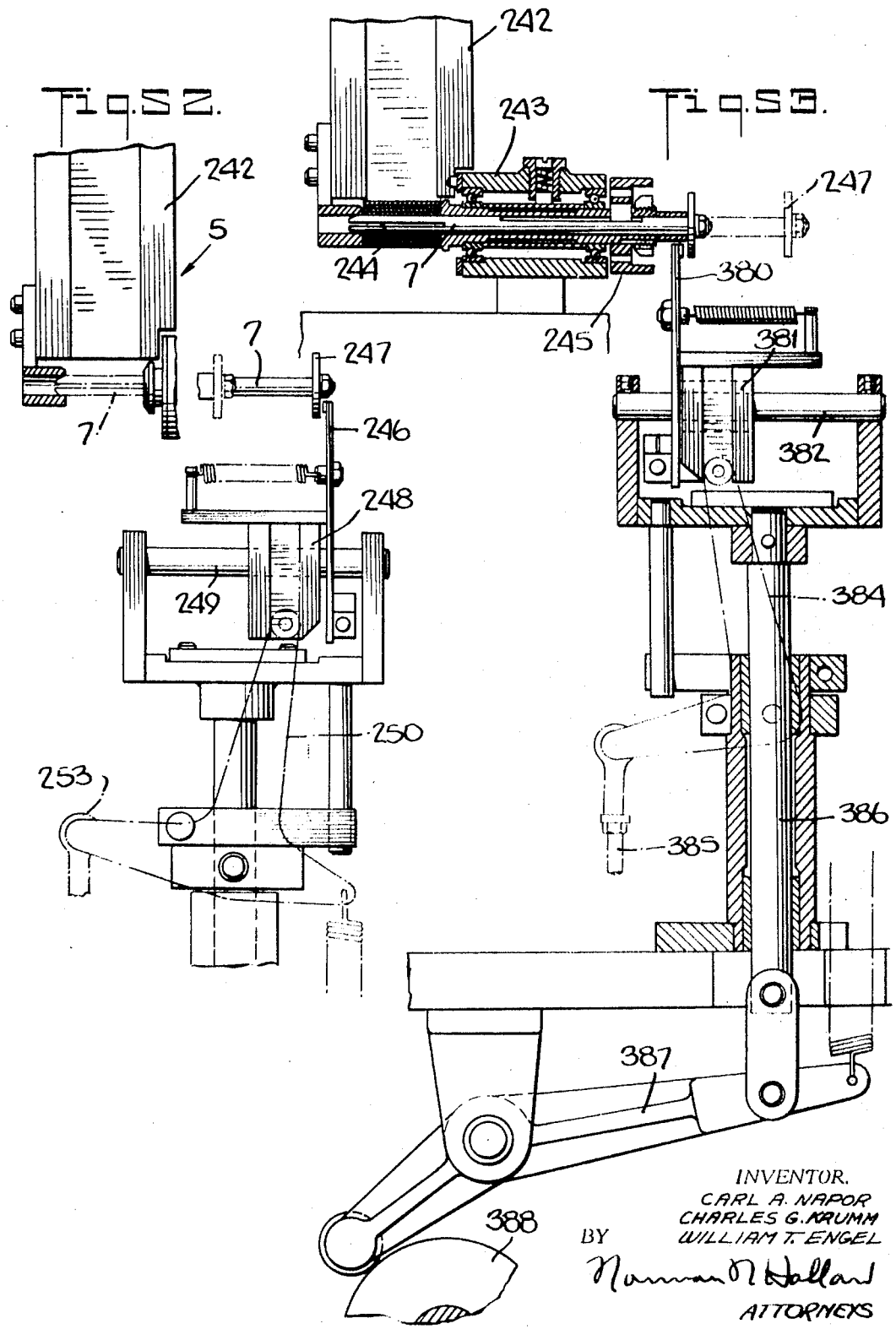

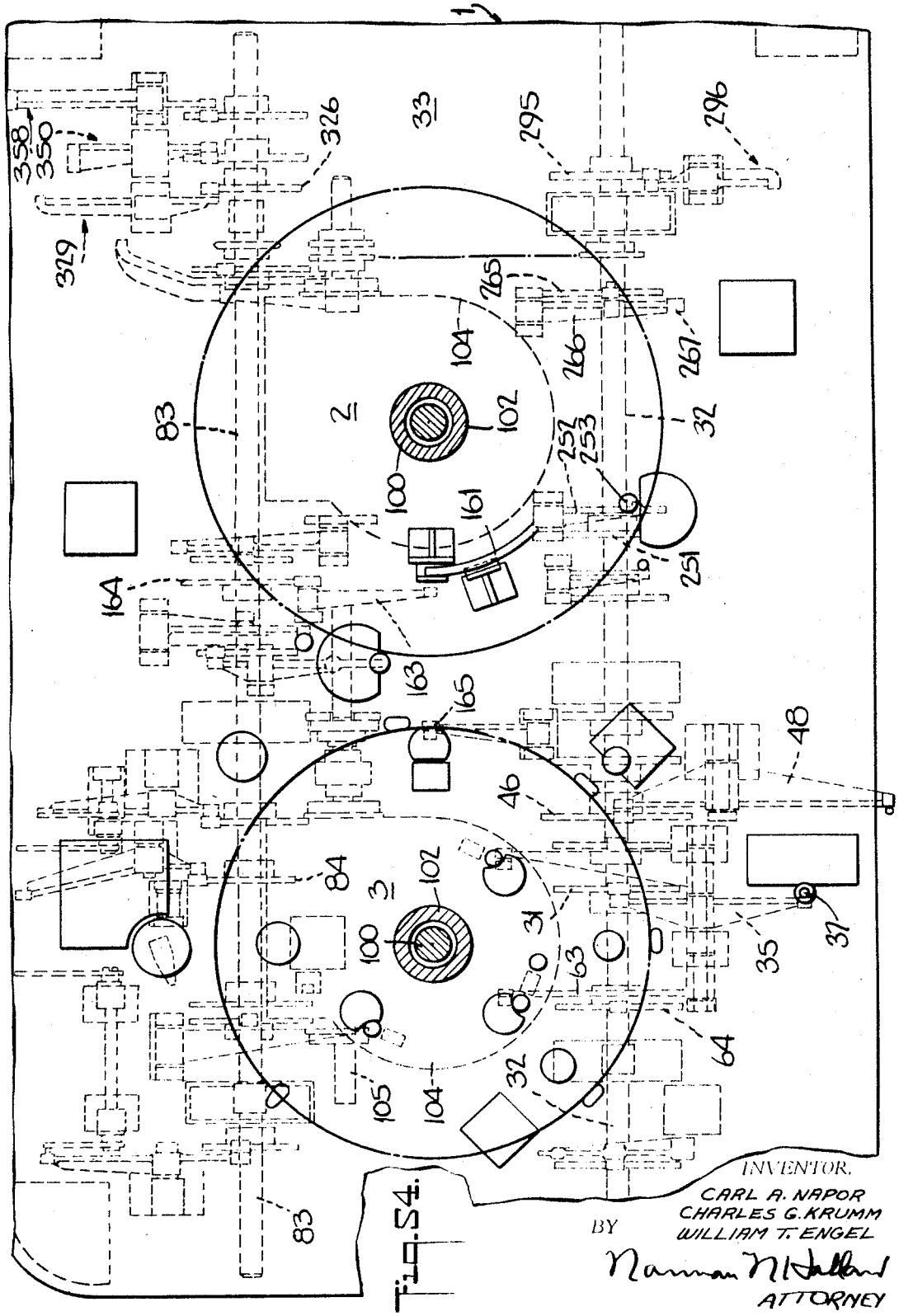

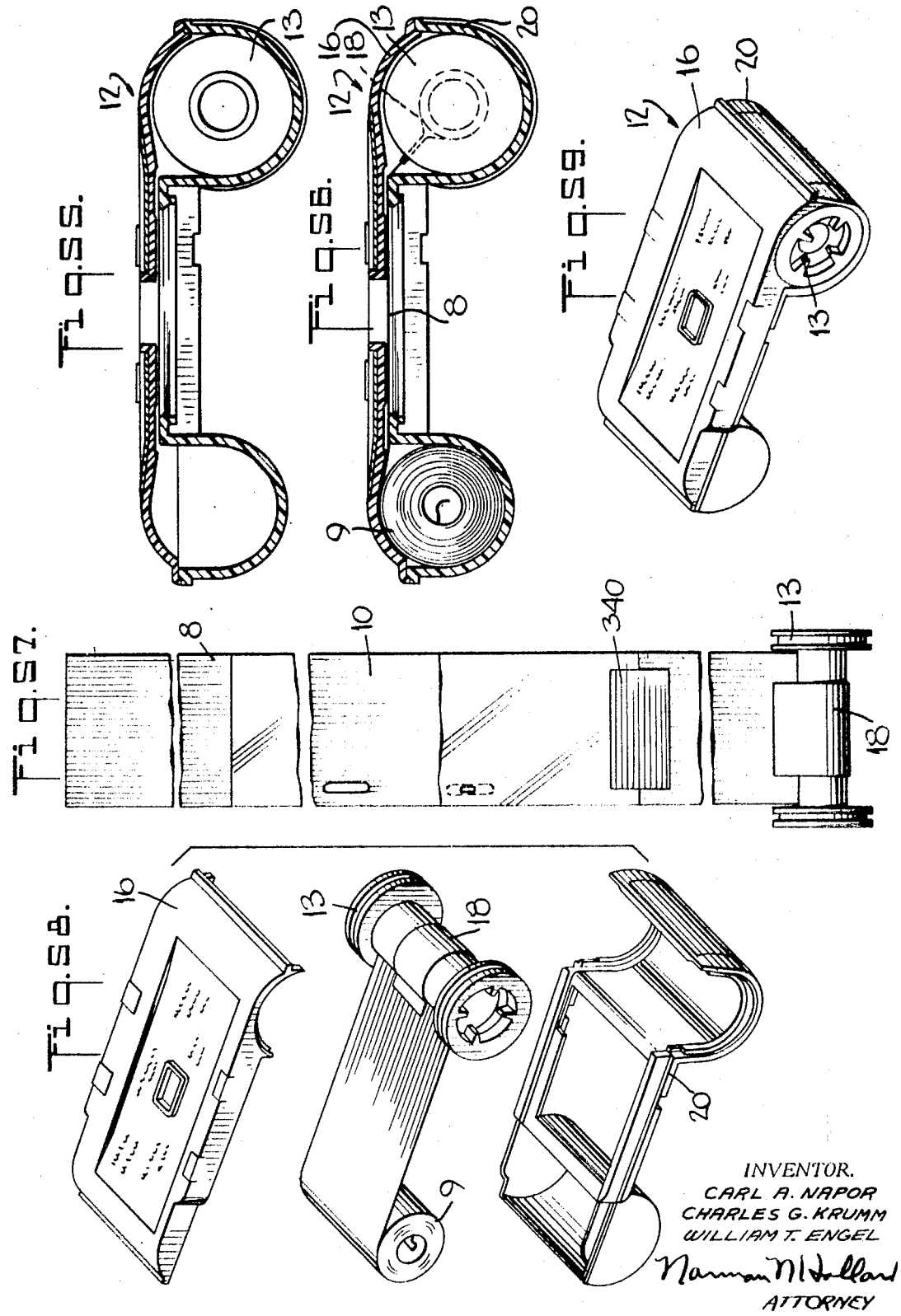

United States Patent Office 3,457,627
Patented July 29, 1969

3,457,627
METHOD AND MEANS FOR LOADING
FILM CARTRIDGES
Carl A. Napor, Glen Ridge, William T. Engel, Union, and Charles G. Krumm, Wyckoff, N.J., assignors to Kahle Engineering Company, Union City, N.J., a corporation of New Jersey
Filed Oct. 26, 1966, Ser. No. 589,578
Int. Cl. B23p 19/04; B65b 63/04
U.S. Cl. 29—430                           30 Claims

ABSTRACT OF THE DISCLOSURE

A two-turret machine for the winding scrolls of film and backing paper and for inserting the scrolls into hollow preformed film cartridges. The two turrets rotate about parallel axes. One turret at a plurality of successive stations winds predetermined lengths of film and backing strips cut from film and backing webs to form scrolls with an extending tab. The other turret at a plurality of successive stations receives and opens the cartridges for insertion of the scrolls from the scroll turret at contiguous stations of the scroll and cartridge turrets. A take-up spool in each cartridge is next attached to the scroll end tab and is reinserted in the open cartridge which is then closed and sealed.

---

The present invention relates to a method and apparatus for automatically loading film cartridges of the type used for photographic film and relates more particularly to a method and apparatus for winding and inserting a scroll of sensitized film and paper of predetermined length within a hollow film cartridge.

The method and apparatus are useful in the manufacture of a film magazine or cartridge as described, for example, in United States Patent No. 3,138,081. This cartridge comprises a hollow plastic body having spaced end portions for receiving film in scroll form and includes a film exposing aperture between the end portions. The apparatus of the present invention automatically loads such a hollow cartridge with a scroll of film in a position to be subsequently advanced from one end of the cartridge to the other as portions of the sensitized film strip are successively exposed in a camera. A method and means of performing such a loading operation are disclosed which represent an improvement over prior semi-automatic operations by performing the various loading steps automatically and which also represent an improvement over prior automatic machines of this type by providing a reliable machine embodied in a relatively compact form so that it is adaptable for use in cartridge assembly operations over a wide range of loading capacities from a reasonably low output to a higher output as needed.

The improved apparatus performs the various loading steps at a series of spaced and cooperating but independently adjustable stations which includes a variety of sensing and automatic control devices so that a continuous and realtively easy surveillance is maintained and related continuing adjustments may be made during operation or during brief halts in the process. The unique arrangements provided for the several steps in the loading process simplify the related operations of the automatic sensing devices to provide a machine of extreme efficiency and including significant, precise, and continuous monitoring so that the rather delicate loading operation may be run with satisfactory results over long periods by relatively inexperienced personnel.

Accordingly an object of the present invention is to provide an improved apparatus and method for loading film cartridges.

Another object of the present invention is to provide a film cartridge loading method and apparatus adapted for use at a variety of cartridge production rates.

Another object of the present invention is to provide an automatic cartridge loading apparatus wherein an intricate film winding operation is uniquely divided into a series of separate but cooperating steps to permit improved monitoring of the process.

Another object of the present invention is to provide an improved magazine cartridge loading method adapted for precise automatic surveillance.

Another object of the present invention is to provide an automatic film cartridge loading machine having a series of related operating stations all uniquely adapted for ready access and rapid adjustment.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic illustration of the cartridge loading steps in accordance with the present invention;

FIG. 2 is a vertical sectional view of the apparatus taken along line 2—2 of FIG. 1A;

FIG. 3 is a sectional view of the cartridge loading Station A taken along line 3—3 on FIG. 1A;

FIG. 4 is a vertical sectional view of the loading Station A taken along line 4—4 on FIG. 3;

FIG. 6 is an enlarged detailed plan view of the cartridge loading Station A;

FIG. 7 is a vertical sectional view of the cartridge loading Station A illustrating the drive means for the cartridge nest;

FIG. 8 is a vertical sectional view of a cartridge nest taken along line 8—8 on FIG. 7;

FIG. 9 is a vertical sectional view of the cartridge nest taken along line 9—9 on FIG. 8;

FIG. 11 is a vertical sectional view of the cartridge nest showing the drive means for the spool holder;

FIG. 12 is a horizontal sectional view of the cartridge nest support taken along line 12—12 on FIG. 7;

FIG. 13 is a vertical sectional view of the cover lifting Station B taken along line 13—13 on FIG. 1A;

FIG. 14 is a vertical sectional view of the cover lifting means at Station B showing the control valve and taken along line 14—14 on FIG. 13;

FIG. 15 is a fragmentary elevational view of the cover probing head at Station B;

FIG. 16 is a fragmentary top plan view of the transfer Station C for transferring the paper and film scroll to an open cartridge;

FIG. 17 is a vertical sectional view of the transfer Station C of FIG. 16 taken along line 17—17 on FIG. 16;

FIG. 18 is a vertical sectional veiw of the transfer Station C taken along line 18—18 on FIG. 17;

FIG. 19 is a vertical sectional view of the scroll alignment means at Station D taken along line 19—19 on FIG. 1A;

FIG. 20 is a detailed enlarged top plan view illustrating the scroll alignment means of FIG. 19;

FIG. 21 is a vertical sectional view illustrating the spool attaching Station E taken along line 21—21 on FIG. 1A;

FIG. 22 is a fragmentary enlarged elevational view of the tape wiping head at Station E;

FIG. 23 is a fragmentary enlarged perspective view of the tape stiffening roller at Station E;

FIG. 24 is a top plan view partially in section of Station E;

FIG. 25 is a horizontal sectional view of Station E taken along line 25—25 on FIG. 21;

FIG. 26 is a horizontal sectional view taken along line 26—26 on FIG. 21;

FIG. 27 is a horizontal sectional view taken along line 27—27 on FIG. 21;

FIG. 28 is a vertical sectional view showing the cover closing Station F with the cartridge in its closed position after the spool loading and fastening and taken along line 28—28 of FIG. 1A;

FIG. 29 is a vertical sectional view showing the cartridge sealing Station G taken along line 29—29 of FIG. 1A;

FIG. 30 is a vertical sectional view illustrating the cartridge unloading Station H taken along line 30—30 on FIG. 1A;

FIG. 31 is a sectional view of the paper feed Station III taken along line 31—31 on FIG. 32;

FIG. 32 is a vertical sectional view of the paper feed Station III feed means taken along line 32—32 on FIG. 1A;

FIG. 33 is a vertical sectional view illustrating the film feed Station V taken along line 33—33 on FIG. 1A;

FIG. 34 is a sectional view of the film cutting means taken along line 34—34 on FIG. 38;

FIG. 35 is a sectional view of the film feeding means taken along line 35—35 on FIG. 33;

FIG. 36 is a horizontal sectional view taken along line 36—36 on FIG. 33;

FIG. 37 is an enlarged fragmentary view partially in section illustrating the film cutter and the mechanical sensing means at the film feeding Station V;

FIG. 38 is an enlarged vertical sectional view illustrating the film feeding means of FIG. 33;

FIG. 39 is a side elevational view partially in section of a scroll winding track assembly;

FIG. 40 is a front elevational view of the scroll winding track assembly;

FIG. 41 is a detailed view partially in section of the paper guide support;

FIG. 42 is a horizontal sectional view taken along line 42—42 on FIG. 40;

FIG. 43 is a horizontal sectional view taken along line 43—43 on FIG. 39;

FIG. 44 is a horizontal sectional view taken along line 44—44 on FIG. 39;

FIG. 45 is a detailed top plan view of the scroll winding arbor positioning Station II;

FIG. 46 is a vertical sectional view of the scroll arbor position Station II taken along line 46—46 on FIG. 45;

FIG. 47 is a vertical sectional view illustrating the scroll arbor positioning Station II;

FIG. 48 is a top plan view of the scroll winding Station VI;

FIG. 49 is a vertical sectional view of the scroll winding Station VI taken along line 49—49 on FIG. 48;

FIG. 50 is a side elevational view of the scroll winding Station VI;

FIG. 50A is a vertical sectional view illustrating the winding track control rod;

FIG. 51 is a vertical sectional view of the scroll winding station taken along line 51—51 on FIG. 50;

FIG. 52 is a vertical sectional view illustrating the scroll winding arbor insertion Station I taken along line 52—52 on FIG. 1A;

FIG. 53 is a vertical sectional view showing the scroll winding arbor removal Station VII taken along line 53—53 on FIG. 1A;

FIG. 54 is a horizontal sectional view taken along line 54—54 on FIG. 2;

FIGS. 55 and 56 are vertical sectional views through a magazine in the unloaded and loaded conditions respectively;

FIG. 57 is a view of an unwound film roll and film paper strip assembly;

FIG. 58 is an exploded perspective view of a loaded cartridge; and

FIG. 59 is a perspective view of a loaded cartridge.

Figure 1A:
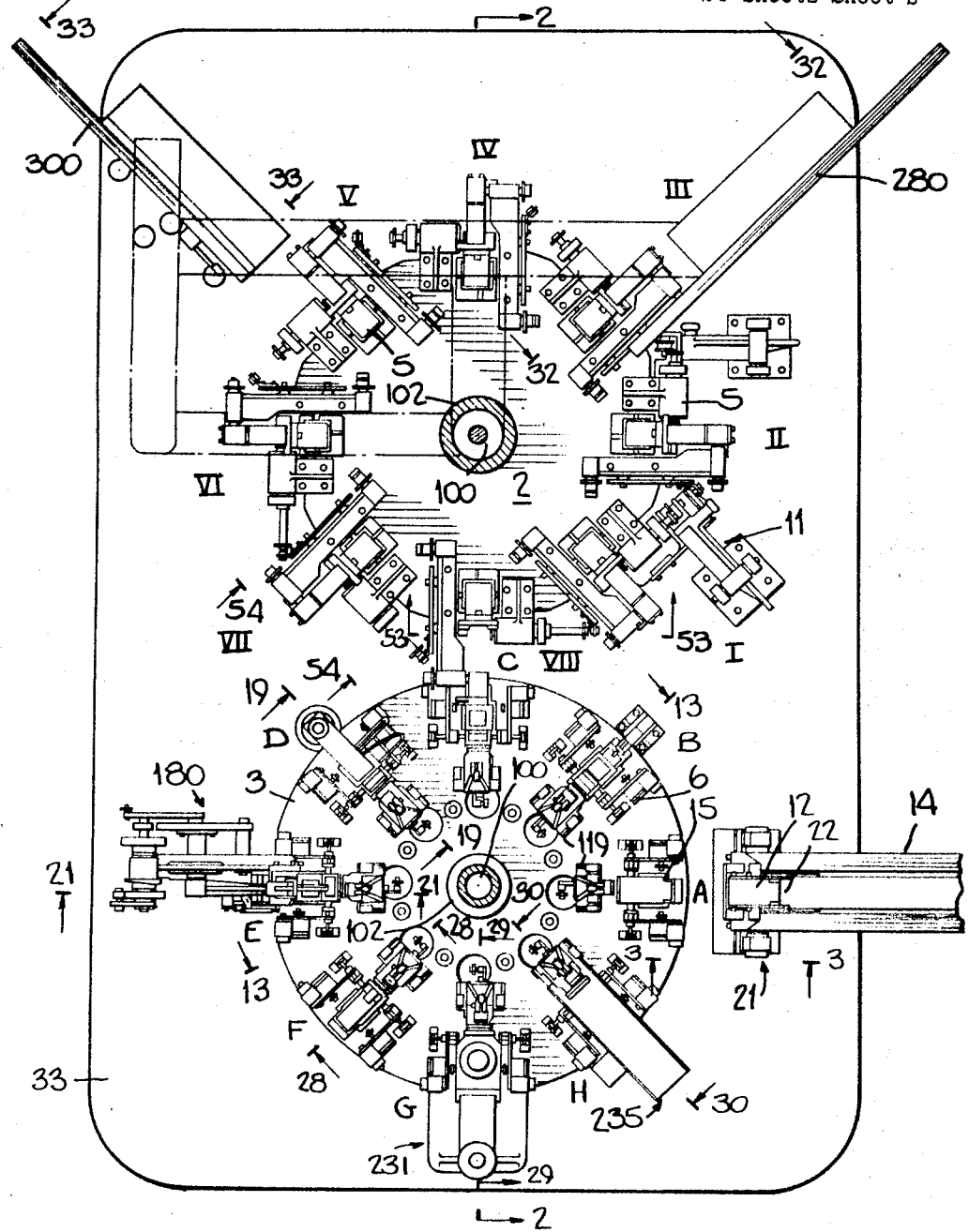
FIG. 1A is a top plan view of a preferred embodiment of the apparatus in accordance with the present invention.

The preferred embodiment of the apparatus 1 in accordance with this invention and for performing the magazine loading operation comprises a pair of rotating turrets 2 and 3 mounted adjacent to one another on a suitable table 4 as illustrated in FIG. 1A. The two turrets 2 and 3 mount working heads which are periodically stepped by the intermittently indexed turrets 2 and 3 to a series of work stations where the various operations of the magazine loading operation process are performed as will now be more fully described.

FIG. 1 is a diagrammatic view illustrating the process performed at each of the stations on the two turrets and shows in a general way the sequence of steps in which the sensitized film and the paper are rolled into a scroll and are then inserted into a hollow plastic magazine which is then sealed.

The steps performed by the two turrets 2 and 3 at the various stations will now each be briefly described with particular reference to FIG. 1 which shows the steps diagrammatically and to FIG. 1A which is a plan view of the machine showing the turrets 2 and 3 together with the working heads 5 on turret 2 and 6 or turret 3.

The upper portion of FIG. 1 diagrammatically illustrates the operations at the eight stations on the scroll winding turret 2. As will be more fully described below, there are eight scroll winding heads 5 on the turret 2 which are stepped from station to station. These winding heads 5 each include a winding arbor 7 which receives the lower end of the paper strip 8 and which thereafter forms a scroll 9 of interwound paper backing strip and film strip 10.

At Station I, the arbor 7 is moved into its winding position by an arbor insertion means 11 further described below under an appropriate heading.

Station II is an arbor positioning station. At this station, the arbor 7 is rotated to align a slot in the arbor 7 with the lower edge of the paper 8 to insure that the paper 8 passes into the slot during the paper loading step.

Station III is the paper loading station where a strip 8 of appropriately notched and printed paper is fed into a paper support track with the lower edge of the paper 8 in the arbor 7 slot.

Station IV is a sensing station which is used to detect the absence of paper 8 due to a failure of the paper feeding mechanism.

Station V is a film feeding station where a length of appropriately notched film 10 is fed into a film track with its lower end positioned against the paper 8 preparatory to the scroll winding step.

Station VI is the scroll winding station where the film and the paper are rolled into a scroll 9.

Station VII is the arbor removal station where the arbor 7 is withdrawn from the wound scroll 9.

Station VIII on the turret 2 is the transfer station at which the completed scroll 9 is transferred to an open cartridge 12 presented at the corresponding transfer station C on the cartridge feed turret 3.

The lower portion of FIG. 1 diagrammatically illustrates the operations at the eight Stations A through H provided on the cartridge feed turret 3. These stations are also illustrated in the lower portion of FIG. 1A where the positions of the stations A through H are illustrated around the periphery of the cartridge feed turret 3.

As seen in FIG. 1A, the scroll winding turret 2 and the cartridge feed turret 3 are mounted on the top of machine 1 with portions positioned adjacent to one another to permit the transfer of a scroll 9 at Station VIII of the scroll winding turret 2 to an open cartridge 12 at a corresponding Scroll transfer Station C on the cartridge feed turret 3.

As will be more fully described below each of the turrets 2 and 3 are intermittently stepped to present the scroll winding heads 5 on the scroll winding turret 2 and the cartridge nests 15 on the cartridge feed turret 3 to the several spaced operating positioned around the edges of the turrets 2 and 3.

The drives for the turrets 2 and 3 are interconnected to synchronize their movement with each other and to permit a timely transfer of a completed scroll 9 to a cartridge bottom 20 on the cartridge feed turret 3.

The general function of the cartridge feed turret 3 is to receive an assembled cartridge 12 consisting of a separate bottom 20 and top 16 (FIGS. 1, 17) and to open the cartridge permitting the insertion of the scroll 9 and to then close and seal the cartridge.

The operations performed at the several stations on the cartridge feed turret 3 will now be summarized.

Station A on the cartridge feed turret 3 is the cartridge transfer station at which a complete cartridge 12 including a scroll take-up spool 13 is transferred from a conveyor 14 to a cartridge nest 15 on the cartridge feed turret.

Station B is the cartridge opening station where the cover 16 is lifted from the cartridge 12.

Station C is the scroll transferring station at which the completed scroll 9 is transferred from station VIII of the scroll winding turret 2 into an open film cartridge 12.

Station D is a scroll aligning station where the end tab 17 on a scroll 9 is aligned and also where the cartridge 12 is checked to detect the absence of a scroll 9.

Station E is the spool attaching station where the cartridge spool 13 is attached by a length of tape 18 to the end tab 17 of the scroll 9.

Station F is the cartridge closing station at which the cartridge cover 16 is replaced.

Station G is a sealing station where an ultrasonic vibrator engages the cartridge 12 to weld the plastic cartridge cover 16 to the cartridge bottom 20.

Station H is the unloading station at which the completed cartridge is removed from the turret 3.

The several stations and their operation will now be described in detail under appropriate headings.

THE CARTRIDGE LOADING STATION A AND CARTRIDGE NEST

The cartridges 12 are continually fed to the cartridge transfer Station A by a continuously running conveyor 14 which supplies a line of closed but unsealed cartridges 12 each containing a scroll take-up spool 13 (FIG. 55). The cartridges 12 are intermittently lifted from the conveyor 14 and placed in a nest 15 on the cartridge feeding turret 3 by the transfer mechanism 21 as illustrated in detail in FIGS. 3–7. This transfer mechanism 21 will now be described in detail with particular reference to FIGS. 3–7.

The transfer station is identified as Station A on FIG. 1A which shows the discharge end 22 of the continuously running conveyor 14 which moves the line of cartridges 12 to the transfer mechanism 21.

FIG. 3 is a vertical sectional view including the discharge end 22 of the conveyor 14 and the transfer mechanism 21 in detail. In this figure the conveyor 14 is moving in the direction of the arrow 23 for moving the endmost cartridge 12 to a transfer cradle 24. The transfer mechanism shown generally at 21 is seen to lift this magazine 12 vertically in the direction of arrow 25 and to thereafter transfer it horizontally to a position above the cartridge nest 15 on the cartridge feeding turret 3. The cartridge nest 15 receives the cartridge 12 when the cartridge 12 is released by the transfer mechanism 21 with the nest 15 as shown in the dash-dot position.

The transfer mechanism has three principal elements for providing the above described operation.

The cartridge is moved as described above by a vertical transfer rod 26 slidably mounted on a transfer carriage 27 in bearings 28 and 29. As best seen in FIGS. 3 and 4 this transfer rod 26 is raised and lowered by a linkage system 30 driven by a rotating cam 31 mounted on a cam shaft 32 in the machine cabinet 33 and which is driven in synchronism with the other driven portions of the machine. The transfer rod 26 is raised and lowered at appropriate intervals by the linkage which includes a cam roller 34 riding on the transfer cam 31 and mounted on the end of a pivoted arm 35 which has a vertical link member 36 pivotally attached to its opposite end. The upper end of the link 36 is pivotally attached to a vertical cam rod 37 having a horizontal cam plate 38 at its upper end. As best illustrated in FIG. 3, the vertical position of the transfer rod 26 in the carriage is controlled by the position of the cam plate 38 through the intermediation of the pivotally mounted cam follower arm 39 having a cam roller 40 on its outer end and being pivotally attached at 41 to the transfer rod 26 at its opposite end.

While the above described coupling is providing the necessary vertical motion of the cartridge 12 on the transfer rod 26, the necessary horizontal travel of the support carriage 27 is provided by a horizontal mounting 44 for the carriage 27. The carriage mounting rod 44 is mounted in suitable spaced bearings 45 and is driven back and forth by a crank connection with a second transfer cam 46 mounted on the same cam shaft 32 as is the first transfer cam 31 already described and suitably shaped to move the carriage 27 in and out through the intermediation of a cam roller 47, spaced cranks 48 and 49 and connecting link member 50.

It is thus seen that appropriately shaped cams 31 and 46 will provide a synchronized transfer of the cartridge transfer rod 26 from the conveyor 14 to the turret nest 15.

A pair of cartridge gripping jaws 52 is mounted on the transfer rod 26 to engage the endmost cartridge 12 during the transfer and to release it at the nest 15. These jaws 52 are illustrated in FIGS. 3 and 4. The jaws 52 are seen to be pivotally mounted at 53 with cartridge gripping projections 54 at their lower end. They are urged into gripping engagement with the cartridge 12 by springs 55 which urge the gripping portions into engagement with the cartridge 12. The jaws are moved to their open cartridge releasing position by the spaced cam rollers 56. The rollers 56 are moved downwardly by the roller mounting head 57 by an air motor 58 (FIG. 3) mounted on the top of the transfer rod 26 and coupled to the rollers 56 through the intermediation of the vertical drive rod 59 positioned within the hollow transfer rod 26. The air motor 58 is activated to open and close the jaws 52 at the proper intervals by a suitable cam (not shown) on the above described cam shaft 31 and which is shaped to engage and control a valve for the air motor 58.

The details of the cartridge nest 15 are illustrated in FIGS. 7–12. The nest includes a cartridge positioning base 60 slidably mounted on a vertical support rod 61 (FIG. 7) for facilitating cartridge loading and removal. The rod 61 and its attached base are momentarily raised at the Scroll Transfer Station C by lift rod 62 which is raised by crank 63 driven by a lift cam 64 on the cam shaft 32. A vertical guide post 65 (FIGS. 7 and 12) and rollers 66 hold the base 60 in position during its up and down movement.

The nest 15 includes a cartridge gripping point 67 (FIG. 8) for releasably holding the cartridge bottom 20 in the nest base 60. The point 67 is urged into engagement with the cartridge bottom 20 by spring 68 operating against pivotally mounted support arm 69. The point 67 is withdrawn to permit entry or removal of a cartridge base 20 by plunger 70 (FIGS. 8 and 9) which is raised against the support arm 69 by a suitably positioned air motor 71 activated by air valves controlled by suitably turned cams (not shown) on the cam shaft 32.

A scroll holder for releasably holding the paper scroll 9 in the cartridge bottom after the scroll is inserted at Station C is also illustrated in detail in FIGS. 8, 12, and 18. Spaced scroll gripping fingers 74 engage opposite sides of a scroll 9 (FIG. 18) to hold it in place. The fingers 74 are swung in and out on pivotally mounted arms 75 which are pushed in by a plunger 76 and out by a plunger 77. Suitably positioned pistons mounted on the machine base 33 as for example at the Scroll Transfer Station C move the plungers 76 and 77 as required.

The nest 15 also includes a pair of spool lift arms 80 which raise the spool 13 at the Spool Attaching Station E (FIG. 21) to permit the taping of the paper tab 17 to the spool 13.

Figure 5:
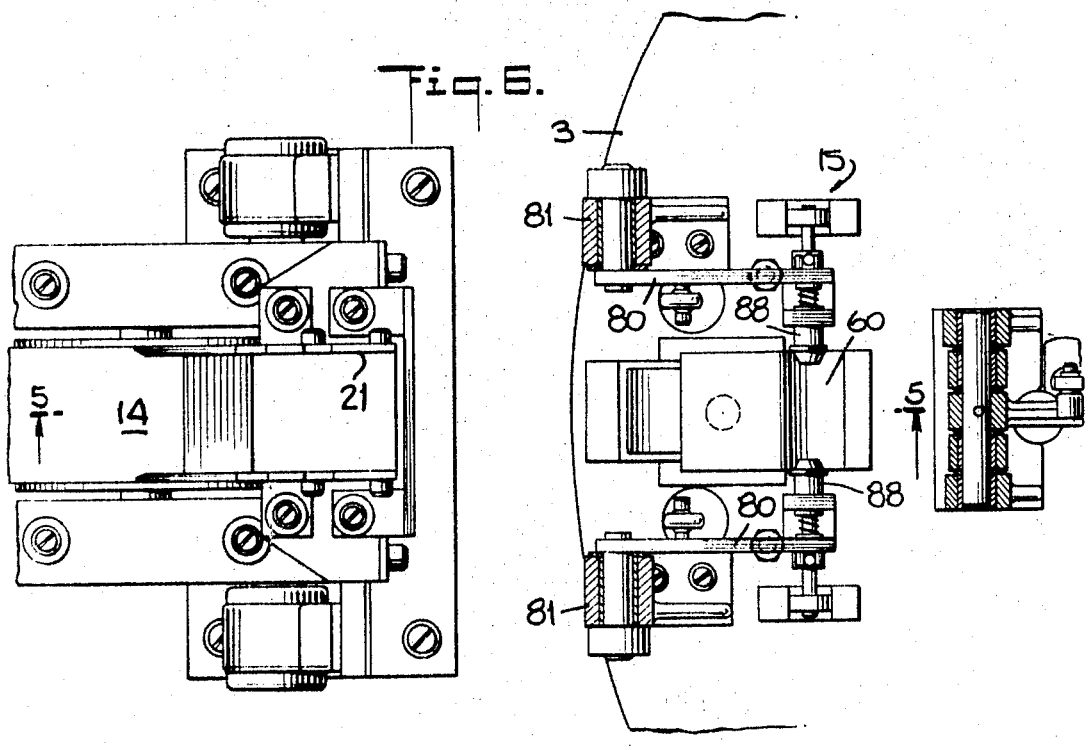
FIG. 5 is a vertical sectional view of the cartridge loading Station A taken along line 5—5 on FIG. 6.
Figure 10:
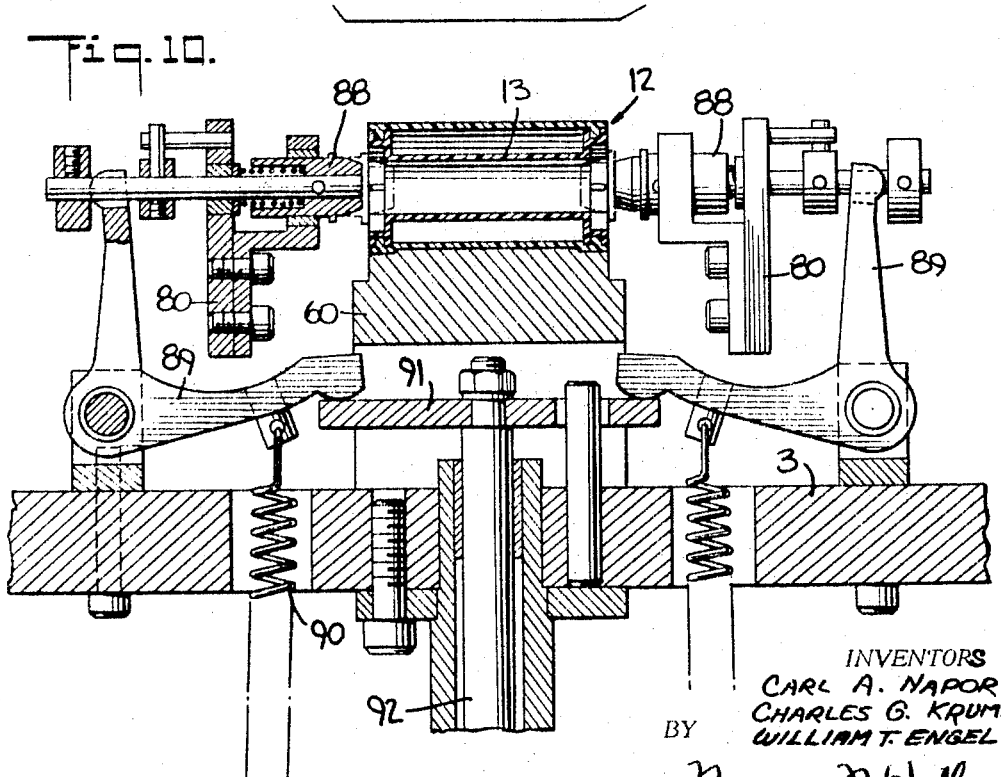
FIG. 10 is a vertical sectional view of the cartridge nest and spool holding means taken along line 10—10 on FIG. 7.

The mounting and operation of the spool lift arms 80 is best illustrated in FIGS. 5, 10, and 11. The outer ends of the arms 80 are pivotally mounted on turret 3 on brackets 81.

A cam 82, illustrated for convenience on FIG. 5, mounted on cam shaft 83 is provided at the Spool Attaching Station E to swing the arms 80 upwardly through the intermediation of cam follower 84, lift rod 85, crank 86 and connecting link 87.

A spool 13 in the cartridge 12 is detachably connected to the arms 80 by the spool holders 88 best illustrated in FIGS. 10 and 11. The holders 88 are disengaged from the spool 13 by a pair of cranks 89 which normally urge the holders upwardly under the force of springs 90 but which swing the holders 88 outwardly and clear of the spool 13 under the force of lift plate 91 mounted on lift rod 92. Air motors 93 are positioned at the Cartridge Transfer Station A and the Unloading Station H to raise the plate 91 to withdraw the spool holders 88.

THE MACHINE DRIVE SYSTEM AND CARTRIDGE OPENING STATION B

As described above, a closed cartridge 12 including a film spool 13 has now been deposited in a nest 15 on the cartridge loading turret 3. This turret 3 is intermittently stepped to move the nest 15 to the next operating station which is the Cartridge Opening Station B.

FIG. 2 which is a vertical sectional view of the machine illustrates generally a preferred embodiment of the drive means for intermittently stepping both the loading turret 3 and the winding turret 2 from station to station. Both of these turrets are rotatably mounted on vertical support shafts 100 which are aligned and supported by suitable bearings 101 in hollow shaft housings 102. Each of these housings 102 has its lower end 103 mounted on the casing of a roller cam indexing mechanism 104. These indexing mechanisms 104 are set for providing the intermittent stepped rotation of the two turrets 2 and 3 in synchronism as the indexing mechanisms 104 are driven continuously by a drive shaft 105 coupled to a suitable variable speed drive motor (not illustrated).

As already described above, the various operations performed at the several stations on both the cartridge loading turret 3 and the scroll winding turret 2 are under the control of a series of cams mounted on cam shafts 32 and 83 (FIG. 54). The rotation of the cam shafts 32 and 83 is synchronized with the indexing movements through a connection with the main drive shaft 105. FIG. 2, for example, illustrates the cam shaft 32 coupled to drive shaft 105 through the intermediation of the sprockets 106 and 107 and a coupling chain 108. The cam shaft 83 is similarly coupled including a sprocket 109 in the main drive shaft 105.

A series of cams are provided on these two cam shafts 32 and 83 for providing both the physical motion of various elements at the several stations and for timing air motors by the direct control of air valves or by controlling electrical switches coupled to air cylinder control solenoids. In addition electrical timing cams are provided for activating photocell and lamp circuits at predetermined inspection intervals as will be more fully described below.

For purposes of clarity, the number of cams and related cam following devices illustrated in FIG. 54 has been limited to certain cams and related devices described in detail in connection with other detailed figures. It is clear that additional cams and cam followers corresponding in design to those described in detail are employed and that a detailed showing and description of these additional cam systems is not required.

At Station B the cartridge cover 16 which has been temporarily placed on the cartridge 12 is removed or lifted clear of the cartridge 12 to permit the subsequent film scroll loading operation. The cartridge opening means 119 which will now be described in detail is illustrated in FIGS. 13 and 14.

The cover 16 for the cartridge 12 is raised by a pivotally mounted vacuum lifter arm 120. One such arm is provided for each cartridge nest 15 and it is pivotally mounted on the cartridge loading turret 3 on a suitable bracket 121. The mechanical motion for swinging the lifter arm 120 clear of the cartridge bottom 20 after the vacuum head 122 on the lifter arm 120 has engaged the cartridge cover 16 is provided by a cam operated system including a pivotally mounted follower arm 123 attached to the machine base 33 and having a cam roller 124 engaging a cover lifting cam 125 as best seen in FIG. 13. The follower arm 123 is coupled by lift rods 126 and 127 to a crank arm 128 operatively attached to the cover lifter arm 120 and adapted to swing the lifting arm 120 to its cartridge engaging position at Station B against the force of a lifting spring 129 which raises the lift arm together with the cartridge cover 16 when the connecting rods 126 and 127 have been lowered by the cartridge opening cam 125.

The preferred coupling between the cartridge cover 16 and the lifter arm 120 includes the vacuum head 122. The vacuum head 122 is provided with several vacuum ports 130 to expose the cover 16 to the vacuum lifting force. These ports 130 are connected through a suitable channel 131 and a coupling hose 132 and a vacuum control system 133 to a rotating hollow manifold 134 mounted on the turret 3 support shaft to turn with the turret 3. The manifold 134 is coupled to a vacuum source through inlet 135. The vacuum control system 133 is illustrated at the right-hand side of FIG. 13 and includes a check valve 136 and a control valve 137 as illustrated in FIG. 14. The fluid shut-off valve 137 is coupled to the manifold 134 by line 138 and to the vacuum head 122 by line 132. The valve control lever 139 cuts off the vacuum source from the vacuum head when the vacuum head 122 is spaced from the cartridge covers 16 to prevent undue vacuum loss through the unengaged heads. Air motors 140 controlled by appropriate turning cams actuate the valve 137 at the proper intervals.

In order to make sure that a cartridge 12 has been placed in the nest 15 and also the cover 16 has been thereafter lifted from the cartridge 12 to permit the subsequent cartridge loading steps, a probe device 145 is preferably included at the cartridge opening Station B as illustrated in FIG. 15. This probe 145 includes a microswitch 146 operated by a slidably mounted probing arm 147. A movable support 148 for the microswitch 146 including a guide roller 149 is lowered by the probing cam 150 on the cam shaft 32 towards the magazine 12 once before the cover 16 is raised and again in the interval after the cover 16 has been raised and before the turret 3 has carried the open cartridge 12 to the Scroll Transfer Station C. The microswitch 146 and the probing arm 147 are physically positioned so that the microswitch 146 is closed on the first probe and so that they will be unaffected and will not engage the cartridge 12 if the cover 16 has been properly lifted from the cartridge bottom 20 on the second probe. If the switch 146 does not open on the first probe or if it does open on the second probe, the machine drive electric control system shuts off the machine operation and operates a suitable indicator light showing the source of the trouble.

THE SCROLL TRANSFER STATION C

After the cartridge 12 has been opened at Station B as described above, the open cartridge 12 is stepped to the Scroll Transfer Station C where a wound scroll 9 (FIGS. 57 and 58) including sensitized film 10 and backing paper 8 is transferred from the scroll winding turret 2 to the cartridge bottom 20 in the loading turret 3.

The winding of a scroll 9 in the scroll winding turret 2 is described below under suitable headings. As seen in FIG. 1A, Station VIII of the winding turret 2 is positioned opposite Station C of the loading turret 3. When the turrets 2 and 3 are stationary as illustrated, a wound scroll 9 which is lightly held in place in the winding arbor 7 of a winding head 5 on the winding turret 2 is transferred into a cartridge bottom 20 on the loading turret 3 as will now be described in detail with particular reference to FIGS. 16, 17, and 18.

FIG. 17 illustrates the lower portion of a scroll winding head 5 which will be more fully described below. When the head 5 has been moved to Station VIII, a wound scroll 9 is clamped between a pair of elongated spring fingers 151. These spring fingers 151 resiliently engage the lower rolled portion of the scroll 9. The scroll 9 is now swung from the winding head 5 in the position illustrated in dash-dot lines in FIG. 17 to the scroll pocket 152 in the cartridge bottom 20. The spring arms 151 are mounted on a crank member 153 pivotally mounted on the winding turret 2 at 154 and including a sprocket 155 and cooperating chain 156 which rotate the gripped scroll 9 at the proper time interval through the intermediation of the drive sprocket 157 and drive arm 158 mounted on the bracket 159 on the bottom of the winding turret 2. A cam roller 160 on the drive arm 158 engages an elongated cam 161 which raises the cam roller 160 to advance the chain 156 and swing the crank 153. The cam 161 is raised to its operative position under the control of its slidably mounted lift rod 162 which in turn is driven by a crank arm 163 operated by a cam 164 mounted on the cam shaft 83 (FIG. 54) positioned in the machine base 33. The nest 15 is raised to receive the scroll 9 on its support rod 61 by a cam controlled lift rod 165 similar to rod 62 described above in connection with the Cartridge Transfer Station A.

When the scroll 9 has been swung to the transfer position as illustrated in solid lines in FIG. 17 the scroll gripping fingers 74 described above are moved from their open position back to their gripping position as illustrated in dash-dot lines in FIG. 18 by the plunger 76 to pull the scroll 9 from the spring arms 151 and to retain it in the bottom 20 of the cartridge 12.

The cam 161 has an elongated surface in the direction of the turret 2 rotation as illustrated in FIG. 54 so that it holds the spring arms 151 in their lowered position during the initial portion of the next turret in movement so that the spring arms 151 are advanced clear of the upstanding tab 17 on the transfer scroll 9 prior to the backward swinging motion of the spring arms 151 for the next scroll winding operation. A downward incline on the cam surface together with a delayed lowering of the cam 161 after the indexing action has started cooperate to provide this result.

SCROLL POSITIONING STATION D

After a scroll 9 has been placed in the open magazine at Stations VIII and C as described above, the indexing magazine loading turret 3 next advances this nest 15 to a scroll positioning station 170 (FIGS. 19 and 20) which insures that the unwound end portion 17 of the scroll 9 is vertically oriented with respect to the magazine bottom 20 to facilitate the subsequent scroll attaching operation which is performed at Station E as described below. The scroll positioning means comprises a pair of opposed curved cam wires 171 which engage the generally vertical scroll tab 17 and swing it to the desired vertical position as the tab 17 is moved through the cam wires by the moving turret 3.

This positioning station 170 also includes a scroll check point as illustrated in FIG. 19. The photoelectric system including a light source 172 and a photocell 173 is activated by a timing switch operated by a cam on the cam shaft 32 so that a light beam 174 is produced only when a tab 17 should be in place to interrupt the beam 174. If no scroll tab 17 is present, the photocell 173 using a conventional amplifier and relay control sends a stop signal to a control relay in the machine drive system.

SPOOL ATTACHING STATION E

As the cartridge bottom 20 leaves the above described Scroll Positioning and Checking Station D, it contains the wound scroll 9 with an unwound end portion 17 positioned in a generally vertical plane. At station E the plastic film spool 13 is swung up to a position adjacent the upper end of the scroll end by spool lift arms 80 and the paper backing 8 of the scroll 9 is attached to the spool 13 by means of a small piece of pressure sensitive tape 18 as will now be described with particular reference to FIGS. 21–27.

FIG. 21 is a sectional view of the Spool Attaching Station E showing a cartridge bottom 20 containing the wound scroll 9 with its vertically extending end portion 17.

As already described in the detailed description of the cartridge nest 15 and illustrated in FIG. 5, the spool lift arms 80 which releasably engage opposite ends of the spool 13 at this station are swung to a generally vertical position by the cam 82 and its associated lift system so that the film spool 13 is positioned just above the top of the scroll end 17. A tape applying mechanism illustrated generally at 180 now cuts a short section 18 (FIG. 22) of the pressure sensitive tape 181 fed from a suitable supply spool 182 and wraps this cut portion around the spool 13 and against the end of the scroll end 17 using a pair of flexibly mounted wiper heads 183 as illustrated in detail in FIG. 22. The several moving portions of the Spool Attaching Station E are driven in timed relation from suitably shaped cams mounted on the cam shaft 83 in the machine base 33 and providing the vertical movement for the various drive rods described below. The means for periodically advancing the tape 181 into position beneath the wiper heads 183 and above the spool 13 is illustrated in FIG. 21. This drive system includes tape advancing rollers 184 and 185 operatively coupled to a drive ratchet 186 through shaft 190 (FIG. 25), pulleys 191 and 192, belt 193 and gear train 194–197 (FIGS. 25 and 26). The ratchet wheel 186 is intermittently advanced by the spring loaded pawl 187 as the pawl drive rod 188 is moved up and down by a cam actuated crank 189. The tape advance preferably includes a pullback means to prevent the end of the tape from sticking to the knife 201. Pins 186' in the ratchet 186 (FIG. 24) are raised by circular cam 190' to engage the pawl support arm 187' during the terminal portion of its return stroke to provide the pullback.

In order to hold the tape 181 in a generally horizontal position, it is formed into the channel shape as illustrated in FIG. 23 by having a grooved surface in the tape advancing roller 185 and a cooperating V-shaped pressure roller 198 mounted on a hinged arm 199 held down by spring 200. Cutting the end portion 18 from the tape 181 and wiping it around the spool 13 is performed substantially simultaneously to insure continuous control of the cut tape. The reciprocally mounted tape cutter blade 201 is driven through the intermediation of connected crank arms 202 and 203 which are intermittently rocked to move the blade 201 through its cutting stroke through the intermediation of a suitable connecting link 204 and cam and cam follower (not shown). The wiping heads 183 are mounted on suitable spring arms 205 on the slidably mounted wiping head 206 which is also intermittently raised and lowered through a drive system including the connected cranks 207 and 208 together with a suitable connecting link 209 and a cam and cam follower (not shown). A tape gripping member 210 is slidably mounted within the wiping head 206 and includes a swing tensioning means 211 to hold it against the tape 18 as the wiping heads 183 move downwardly around the spool 13 and against the scroll end 17 as illustrated in detail in FIG. 22.

A scroll end 17 stiffener is shown at 212 in FIG. 21. This includes spaced gripping members 213 and 214 whose facing surfaces have complementary curved faces 215 and 216 as best seen in FIG. 27. These curved portions are brought together during the tape wiping operation to curve and stiffen the scroll end 17 through the intermediation of a cam operated drive including a cam 217 (FIG. 21) and cam follower arm 218 which are connected to a vertical crank shaft 219 through the intermediation of a connecting link 220. The slidable supports 221 and 222 for the two gripping members 213 and 214 are driven in opposite directions to cause the members 213 and 214 to grip the scroll end 17 by the double ended crank member 223 shown in FIG. 27 which engages pins 224 and 225 on the two slidably mounted supports 221 and 222.

After the spool 13 has been taped to the scroll end 17 the scroll lifting arms 80 are swung down to their original horizontal position so that the film spool 13 is returned to the cartridge bottom 20 with the scroll end 17 attached to it.

CARTRIDGE CLOSING STATION F

When the cartridge leaves station E, the film loading is complete except for the closing and sealing of the cartridge 12. The cartridge 12 is reclosed at station F by the relowering of the cover lift arm 120 to snap the cover 16 onto the cartridge bottom 20 as the scroll gripping fingers 74 (FIG. 8) are swung open. FIG. 28 illustrates the cartridge 12 reclosed with the cover lift arm 120 in its lowered position and cover 16 in place on bottom 12 under the control of the connecting rod 127 and a cam system 230 similar to system 123–126 described in connection with the Cartridge Opening Station B. When the cover is in place, the vacuum is released by closing valve 137 (FIG. 14). The lift arm 120 may then be raised leaving the cover 16 on the cartridge bottom 20.

THE SEALING STATION G

The loaded and closed cartridge 12 is next stepped to the Sealing Station G. The preferred sealing means comprises a ultrasonic sealing means 231 for plastic and includes a sealing head 232 which is vibrated at ultrasonic frequencies after being lowered by a suitable head support 233 controlled and synchronized by a cam operated control system or cam shaft 32. These sealing means 231 for sealing plastic are commercially obtainable and the seal is perforated by the localized heat generated between the contact and vibrating surfaces of the cartridge top 16 and bottom 20.

THE UNLOADING STATION H

The sealed cartridge 12 is now carried to the Unloading Station for transfer to a suitable discharge conveyor or packing means. A preferred embodiment of the unloading station is illustrated in FIG. 30. The unloading is performed with the aid of the cartridge lift arm 120 which re-engages the entire cartridge 12 and lifts it to the position illustrated in solid lines in FIG. 30 by the combined operation of the connecting rod 127 by a suitable cam drive system (not shown), similar to drive 230 and the opening of vacuum valve 137 (FIG. 14). Thereafter the discharge chute 235 is swung beneath the raised cartridge 12 through a cam drive system on cam shaft 32 including drive cam 236, follower arm 237 and coupling link 238. The vacuum is now released by closing valve 137 (FIG. 14) dropping the cartridge 12 onto the chute 235 so that when the chute 235 is returned to its inclined position as shown in dash-dot lines, the cartridge 12 slides clear of the loading turret 3.

ARBOR INSERTION STATION I

The several stations on the scroll winding turret 2 will now be further described.

As described above there are a series of scroll winding heads 5 mounted on the edge of the turret 2. Each of these heads 5 includes a generally vertical scroll winding assembly consisting of a paper track 240 (FIG. 39) for receiving a length of paper 8 at the Paper Feed Station III and an angularly connected film track 241 for receiving film at the film loading Station V. At the bottom of the common lower portion 242 of the two tracks, the scroll winding arbor 7 is rotatably mounted in a bearing 243 (FIG. 53) to permit the arbor slot 244 to receive the lower end of the paper strip 8. The arbor 7 includes a drive pulley 245 for the winding operation at the Scroll Winding Station VI as will be more fully described below. The arbor 7 is also slidably mounted in the bearing 243 to permit the arbor 7 to be drawn clear of the wound scroll 9 during the transfer of the scroll 9 to the cartridge loading turret 3 at the Scroll Transfer Station C already described above.

The Arbor Insertion Station I on the scroll winding turret 2 reinserts the arbor 7 for the next scroll winding cycle. The insertion device 11 is illustrated in detail in FIG. 52.

The insertion device includes an arbor return finger 246 positioned to engage the end of the arbor 7 at or near the circular arbor slot positioning cam 247. The finger 246 is slidably mounted on a spring loaded carriage 248 whose position on a support rod 249 is controlled by a rocker arm 250 moved at the proper interval by a cam 251 (FIG. 54) on cam shaft 32, follower rod 252, and connecting rod 253.

ARBOR POSITIONING STATION II

After the arbor 7 has been pushed in at Station I to its paper receiving position, it is necessary to rotate the arbor 7 in its bearing 243 so that its slot 244 is radially aligned to receive the paper end.

The arbor 7 positioning means 260 is illustrated in detail in FIGS. 45–47. The arbor is rotated at this position by a drive pulley 261 mounted on the pivoted support arm 262 and driven by a belt 263 from a drive motor 264 also attached to the arm 262.

The arm 262 is raised at the proper interval by a cam 265 on cam shaft 32 (FIG. 54) by follower arm 266 and connecting rod 267 so that drive pulley 261 engages the arbor pulley 245 to turn the arbor. The drive is energized by a suitable control cam and is cut-off at the proper time by a control switch 270 as a control notch 271 on the slot positioning cam 247 receives the switch arm 272 to open the switch 270.

PAPER FEEDING STATION III AND STATION IV

As described above, the scroll winding turret 2 has a series of winding arbors 7 mounted at its edge in which combined paper and film scrolls 9 are wound. The arbors 7 are mounted below a first track 240 for receiving the strip 8 (FIG. 1) of backing paper and a second spaced track 241 for receiving the film 10 (FIG. 1) and a combined track 242 in which the paper and film are drawn together and at the bottom of which the scroll 9 is wound.

At station III a strip of paper is fed into the paper track 240 and is cut to form a strip 8 (FIG. 1) of the desired length. This paper feeding station is illustrated in FIGS. 31 and 32. The various elements of the paper feed system are mounted on a generally vertical backing plate 280. A roll of paper 281 is mounted on a suitable spool 282 at the lower portion of the plate 280 and a spring biased drag member 283 engages the edge of the roll 281 to control its rotation. The paper web 284 is directed from the roll 281 towards the upper portion of the backing plate 280 on a series of guide rollers 285 including a broken paper detecting arm 286 held up as long as the paper strip 284 continues to be fed but is arranged to drop and operate a microswitch 287 to halt the machine in the event the paper web 284 breaks or when the supply roll 281 is depleted. A drive motor 288 is mounted on the rear surface of the plate 280 which is coupled through a suitable drive system to a paper drive roller 289 which is intermittently driven to feed the paper web 284 downwardly into the paper track 240. The motor 288 is started by a suitable cam and microswitch (not illustrated) mounted on a cam shaft in the machine base so that the paper feed is started an appropriate interval after the scroll winding turret 2 has been indexed to place a track 240 adjacent the drive roller 289. A paper cutting knife 290 (FIGS. 31 and 32) is controlled by a photocell 291' adjacent the lower end 242 of the track 241. When the beam for the photocell 291' is obscured by the leading edge of the paper, it slows the drive motor 288. When the first paper sprocket hole passes photocell 291', the drive motor 288 is stopped with the paper end in arbor slot 244 and the knife 290 is operated by air cylinder 297 to cut the paper.

Three air operated plungers 291, 292, and 293 are all activated at this station by suitable control cams to position the paper deflector 379, and to release paper clamps 373 and 375 respectively to facilitate the paper feed in the track 240 as further described below in connection with the Scroll Winding Station VI and the details of tracks 240.

A pinch roller 294 is pivotally mounted on the plate 280 to cooperate with the drive roller 289. The pinch roller is released and swung clear of the drive roller 288 between drive cycles by the cam 295 and coupling linkage 296.

FILM FEEDING STATION V

After a strip of paper 8 has been fed into the paper track 240 as described above, the winding turret 2 now indexes to present this winding head 5 to the Film Checking Station IV and then to the Film Feeding Station V. At Station V a short length of sensitized film 10 (FIG. 1) is fed into the film track 241 for subsequently being wound into the completed scroll 9. This Station V also includes a generally vertical mounting plate 300 and a rolled supply of sensitized film 301 is mounted on a suitable spool 302 on the lower portion of the plate 300. The web of film 303 is directed past a series of guide rollers 304 to a driving roller 305 and then into the film track 241. A pivotally mounted cut-off arm 306 is held by gravity against the film web 303 in a position to operate a machine control microswitch 307 in the event the film web 303 breaks or the film supply is depleted. The film drive roller 305 is driven by a suitable electric motor 308 mounted on a back plate 300 and coupled to the drive roller by pulleys 309 and 310, coupling belt 311 and shaft 312 as illustrated in FIG. 35. The rotation of this drive motor is initiated by a suitable cam in the machine base synchronized to begin the feed a short interval after the termination of the winding turret stepping motion which has moved the film track 241 into loading position.

As is the case with the paper it is necessary to cut the film web 303 to a predetermined length. A cutter blade 313 is illustrated in detail in FIGS. 37 and 38 which illustrate the slide mounting 314 for the blade 313 positioned slightly below the film drive roller 305. The drive for the cutting blade 313 includes a crank 315 coupled to the blade 313 by a pivoted link 316 and mounted on a shaft 317 on the mounting plate 300. A second crank 318 (FIG. 33) is coupled to the opposite end of the mounting shaft 317 and is driven by a linkage from the main drive (not shown). The film is slowed down when the leading edge of the film obscures the beam for the photocell 319. The feed motor is stopped when the first film perforation passes the light beam from photocell 319.

A short length of pressure sensitive tape 340 (FIGS. 1 and 57) is also attached to the upper end of the cut film 10 at Station V. This tape subsequently attaches the film 10 to the paper strip 8 during the scroll winding operation to be described below. A tape roll 341 is mounted on a suitable supply spool 342 rotatably mounted at the upper portion of the support plate 300. The tape 343 from the roll 342 is fed over a guide roller 344 and drive roller 345 through a guide track 346 illustrated in FIG. 37 and adjacent the cutter blade 313. As the apertured edge 330 of the cutter blade cuts the film web 303, the upper edge 347 of blade 313 simultaneously cuts off the end of the tape web 343. The return movement of the blade 313 and the spring loaded pressure head 348 moves this short length of tape 340 back into engagement with the tip 349 of the film strip 10 which raises to receive it as illustrated in dash-dot lines in FIG. 37.

A mechanical sensing device is included adjacent the film cutting station as illustrated in detail in FIGS. 37 and 38. This includes a sensing rod 320 which is moved against the tape 8 after the cutting operation so that its axial position is determined by the presence or absence of tape at this position. Where tape 8 is absent, the rod 320 will move a slight distance further towards the film causing the adjustable screw 321 on bracket 322 to engage the pivoted latch 323 whose rotation by the screw releases the trigger member 324 operating the microswitch 325 to cut off the machine drive. The rod 320 is driven by cam 326 (FIG. 33) and cranks 327 and 328 through connecting linkage 329.

The intermittent drive for the tape drive roller 345 is illustrated in FIGS. 33 and 36. It includes a cam operated drive rod 350 and connecting crank system 351 which intermittently advances drive shaft 352 through one-way drive coupling 353, shaft 354, and gears 355 and 356.

A pivotally mounted pinch roller 357 operating with the film drive roller 305 is released from contact between film drive cycles by a cam operated drive coupling 358.

THE SCROLL WINDING STATION VI

After the short lengths of paper 8 and film 10 have been fed into the winding tracks 240 and 241 at Stations III and V as described above, the winding turret 2 now advances the head 5 to the Scroll Winding Station VI where the winding arbor 7 at the lower end 242 of the track winds the paper and the film into a tight scroll 9. During this winding the upper edge of the fastening tape 340 is forced against the paper 8 thereby attaching the film 10 to the paper 8 just as the final portion of the film is wound into the scroll 9.

The winding mechanism at the winding Station VI is illustrated in detail in FIGS. 48 through 51. At the Paper Feed Station III as described above, the lowermost edge of the paper strip 8 has been inserted in the slot 244 in rotatable winding arbor 7. When the arbor 7 is moved to the winding station, the arbor is rotated to draw both the paper backing strip 8 and the film strip 10 onto the arbor 7 until the winding operation is terminated leaving a generally vertical end strip 17 of paper (FIG. 1) to be used in the subsequent cartridge loading operation as will be described below. The winding means for rotating the arbor 7 is mounted on a pivotal support arm 360 on a bracket 361 on the machine base 33 as best illustrated in FIG. 50. The drive includes an electric motor 362 which is coupled to a drive pulley 363 by a coupling belt 364. The drive pulley engages 363 the outer drive pulley 245 on the winding arbor 7 when the support arm 360 has been raised to its winding position as illustrated in FIG. 50 and so that the drive pulley 363 is in frictional engagement with the drive pulley 245 on the arbor 7. The means for raising and lowering the motor arm 360 is best illustrated in FIG. 50 and includes a lifting cam 365 controlling the cam follower arm 366 which is coupled to the motor support arm 360 by an adjustable link 367. This drive means moves the winding motor 362 between its inoperative position illustrated in FIGS. 48 and 49 and its winding position as illustrated in FIGS. 50 and 51. The winding motor 362 is energized by a cam operated switch and the winding is terminated by the photocell system illustrated in FIG. 50A. When the upper edge of the paper strip passes below the beam between lamp 377 (FIG. 40) and photocell 368 (FIG. 50A) the motor is slowed and when the end of tab 17 passes below the beam between lamp 378 (FIG. 40) and the photocell 369 the drive motor is stopped.

The spring loaded paper clip 375 shown at the top of FIG. 39 is released at the start of the scroll winding operation as the winding signal moves the piston rod of an air cylinder 371 (FIG. 50A) against the clip 375.

A pair of spring loaded pinch rollers 373 and 374 (FIG. 39) which engage the film strip 10 and paper 8 are released during the interwinding of the film strip and paper backing strip into the scroll to permit relative movement of the paper 8 with respect to the film 10 which is necessary as the paper being on the outside of the film 10 in the scroll 9 forms a larger spiral. These rollers 373 and 374 are released by the air cylinder 372 (FIG. 50A) swinging the pivotally mounted roller 373 outwardly as the paper end clears the light beam between photocell 370 (FIG. 50A) and light source 376 (FIG. 40).

A spring loaded guide 379 guides the lower end of the paper outwardly and into the arbor slot 244 during the paper feed and then will swing clear to facilitate the winding operation.

ARBOR REMOVAL STATION VII

After the scroll 9 is wound on the arbor 7 and before the scroll is transferred to the cartridge feed turret 3 for insertion into the cartridge 12 it is necessary to withdraw the arbor 7 from the scroll 9. This is done at the arbor removal station VII by the withdrawal means illustrated in FIG. 53 and generally similar to the arbor insertion device of FIG. 52.

The removal finger 380 is mounted on the slidable carriage 381 on guide rod 382 to slide the arbor 7 outwardly, as illustrated, under the control of a suitable crank 384 and connecting rod driven by a suitable cam in the machine base (not illustrated). The finger 380 is moved into its operative position by lift rod 386 under the control of crank 387 and cam 388.

SCROLL TRANSFER STATION VIII

The scroll 9 is now ready for transfer to a cartridge on the cartridge feed turret 3. This is performed by the cooperating action of this Station VIII on the scroll winding turret 2 and the Transfer Station C on the turret 3 as already described.

It will be seen that an improved method and means has been provided for winding a film and paper scroll and for inserting it into a hollow cartridge.

The method and means are particularly suited for a substantially fully automatic operation with the individual steps being rapidly and precisely performed while at the same time being adapted for step-by-step checking, adjustment, and repair.

This provides a substantially fully automatic performance of a delicate operation by a machine adaptable for a wide range of manufacturing speeds and one which is particularly useful for cartridge loading operation ranging from a medium quantity output to the highest output requirements.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. Apparatus for loading film cartridges with scrolls of an interwound film strip and a film backing strip and a connected scroll take-up spool comprising the combination of a movably mounted cartridge support for presenting hollow film cartridges having removable covers and take-up spools therein successively to a plurality of operating stations, means at one of said stations to feed cartridges to said cartridge support, means on said cartridge support for thereafter temporarily removing the cartridge covers, means to wind the scrolls, means at another of said stations for inserting the scrolls into the open cartridges on said support, means at another of said stations for attaching the scrolls to the spools, and means for thereafter sealing the cartridges with the spools and scrolls within the cartridges.

2. The apparatus as claimed in claim 1 in which said cover removal means comprises a vacuum device.

3. The apparatus as claimed in claim 1 in which said cartridge feed means comprises a continuously moving cartridge feed conveyor, cartridge gripping jaws, and a carriage for intermittently moving said jaws between said cartridge support and said conveyor.

4. The apparatus as claimed in claim 1 in which said scroll attaching means comprises a tape feed, a tape cutter, and a tape applicator.

5. The apparatus as claimed in claim 1 which further comprises scroll detection means intermediate said scroll insertion means and said attaching means.

6. The apparatus as claimed in claim 1 which further comprises cover sensing means in advance of said scroll transfer means.

7. Apparatus for loading film cartridges with scrolls of an interwound film strip and a film backing strip having an end tab and a connected scroll take-up spool comprising the combination of a movably mounted cartridge support for presenting hollow film cartridges having removable covers and take-up spools therein successively to a plurality of operating stations, means at one of said stations to feed cartridges to said cartridge support, means on said cartridge support for thereafter temporarily removing the cartridge covers to provide open cartridges, means to wind the scrolls with the end tabs of the backing strips exterior to the scrolls, means at another of said stations for inserting the scrolls into the open cartridges on said support, means on said support for removing the spools temporarily from the open cartridges, means for attaching the end tabs of the scrolls to the spools while the spools are out of the open cartridges, and means for thereafter attaching the cartridges' covers to the open cartridges with the spools and scrolls within.

8. The apparatus as claimed in claim 7 which further comprises means at said cartridge support beyond said scroll transfer means for positioning the end tabs in a generally vertical position.

9. The apparatus as claimed in claim 7 which further comprises means at said cartridge support beyond said scroll transfer means for sensing the end tabs.

10. Apparatus for loading film cartridges with scrolls of an interwound film strip and a backing strip having an end comprising the combination of means for supporting an unwound strip of film of predetermined length, means for supporting an unwound strip of backing of a predetermined length, a rotatably mounted scroll winding arbor, said film and backing supporting means being positioned to direct one end of the film and of the backing to said arbor, means for rotating said arbor for winding the scroll, means for gripping the wound scroll, means for withdrawing said arbor from the wound scroll, a movably mounted cartridge support for presenting hollow film cartridges having removable covers and take-up spools therein successively to a plurality of operating stations, means at one of said stations to feed cartridges to said cartridge support, means on said cartridge support for thereafter temporarily removing the cartridge covers, means at another of said stations for moving a wound scroll into an open cartridge on said support from said scroll gripper, means on said cartridge support for removing the spools temporarily from the open cartridges, means at another of said stations for attaching the backing strip end of an inserted scroll to a spool while the spool is removed from the cartridge, and means for thereafter sealing the cartridge with the attached spool and scroll within the cartridge.

11. Apparatus for loading film cartridges with scrolls of an interwound film strip and a backing strip having an end comprising the combination of a plurality of scroll winding heads, a movably mounted support for said heads, each of said heads comprising means for supporting an unwound strip of film of predetermined length and means for supporting an unwound strip of backing of a predetermined length, a rotatably mounted scroll winding arbor on each head, said film and backing supporting means being positioned to direct one end of the film and the backing to said arbors, means for rotating said arbors for winding the scrolls, means for gripping the wound scrolls, means for withdrawing said arbors from the wound scrolls, a movably mounted cartridge support for presenting hollow film cartridges having removable covers and take-up spools therein successively to a plurality of operating stations, means at one of said stations to feed cartridges to said cartridge support, means on said cartridge support for thereafter temporarily removing the cartridge covers, means at another of said stations for moving a wound scroll into an open cartridge on said support from one of said wound scroll grippers, means on said cartridge support for removing the spools temporarily from the open cartridges, means at another of said stations for attaching the backing strip end of an inserted scroll to a spool while the spool is removed from the cartridge, and means for therefater sealing the cartridge with the attached spool and scroll within the cartridge.

12. Apparatus for winding a scroll of interwound film strip and a longer backing strip each having an end comprising the combination of means for supporting an unwound strip of film of a predetermined length, means for supporting an unwound strip of backing of a predetermined length, a rotatably mounted scroll winding arbor, said film and said backing supporting means positioned to direct the ends of said film and said backing to said arbor, means for rotating said arbor for winding the scroll, and means for withdrawing said arbor from the wound scroll.

13. The apparatus as claimed in claim 12 in which said means for rotating said arbor comprises means for turning said arbor at a plurality of speeds of decreasing rates.

14. The apparatus as claimed in claim 12 in which said means for rotating said arbor comprises means for turning said arbor at a plurality of speeds, and photocells positioned adjacent said strip supporting means operatively coupled to said arbor rotating means for controlling said arbor speeds.

15. Apparatus for winding a scroll of an interwound film strip and a longer backing strip comprising the combination of means for supporting an unwound strip of film of predetermined length, means for supporting an unwound strip of backing of a predetermined length, means for feeding a web of film into said film supporting means, a film cutter, means for feeding a web of backing into said backing support means, a backing cutter, a rotatably mounted scroll winding arbor, said film and backing supporting means positioned to direct the ends of said film and of said backing to said arbor, and means for rotating said arbor for winding said scoll.

16. Apparatus for winding a scroll of an interwound film strip and a longer backing strip comprising the combination of a track for supporting an unwound strip of film of predetermined length, a second track for supporting an unwound strip of backing of a longer predetermined length, means for feeding a web of film into said film track, a film cutter for severing a predetermined length from the web of film and forming the leading end of the succeeding film strip, means for feeding a web of backing into said backing track, a backing cutter for severing a predetermined length from the web of backing and forming the leading end of the succeeding backing strip, a rotatably mounted scroll winding arbor, said film and backing tracks positioned to direct the leading ends of the film strip and of the backing strip to said arbor, means for rotating said arbor for winding the cut predetermined lengths of film strip and backing strip into a scroll, and means for withdrawing said arbor from the wound scroll.

17. The apparatus as claimed in claim 16 which further comprises means for detecting the absence of film in said film feed means.

18. The apparatus as claimed in claim 16 which further comprises the absence of backing in said backing feed means.

19. The apparatus as claimed in claim 16 which further comprises a common gripping means on said arbor for engaging said arbor for engaging the film and the backing, and means for aligning said gripping means to receive the leading ends of the film and the backing.

20. The apparatus as claimed in claim 16 which further comprises means for detecting the absence of film in said film track in advance of said backing feed means.

21. The method of winding a protective web and a sensitized film into a scroll and inserting the scroll into a hollow magazine comprising the steps of supporting a length of the protective web, placing a length of sensitized film adjacent to the said length of protective web, forming a scroll by winding portions of the two lengths together commencing at adjacent ends, terminating the winding of the scroll leaving an unwound end portion on one of said lengths, fastening said lengths together adjacent said unwound end, inserting the wound scroll portion into the hollow magazine, and fastening the unwound end to a spool.

22. The method of winding a protective web and a sensitized film from rolls of web and film into a scroll and inserting the scroll into a hollow magazine which comprises the steps of supporting a straight length of the protective web in a holder, placing a length of sensitized film in a second holder adjacent to the said length of protective web, forming a scroll by winding portions of the two lengths together commencing at adjacent lower ends, terminating the winding of the scroll leaving an unwound end portion on one of said lengths, fastening said lengths together adjacent said unwound end, opening the magazine and inserting the scroll portion and the spool into spaced portions of the hollow magazine, and fastening the unwound end to the spool.

23. The method as claimed in claim 22 which further comprise the steps of placing the winding spool into the closed magazine prior to the scroll, fastening the spool to the said unwound end by opening the magazine and moving the spool out of the magazine to the said end and taping it thereto, and thereafter returning the spool to the magazine and closing the magazine.

24. The method as claimed in claim 22 which further comprises the steps of forming a magazine casing in two portions and closing the magazine casing with a winding spool inserted therein, thereafter removing one portion of the magazine casing prior to the inserting of the scroll, and removing the spool from the other portion of the magazine casing as it is fastened to said unwound end.

25. The method as claimed in claim 24 in which the spool is first inserted in the magazine in an illuminated zone, and the remaining of said step are performed in a darkened zone.

26. The method of automatically assembling and loading a hollow film cartridge having separate top and bottom portions and including a spool and a scroll of interwound sensitized film and protective paper comprising the steps of inserting the spool in one of the cartridge portions, closing the cartridge by applying the other cartridge portion, moving the cartridge to a darkened zone, interwinding unequal lengths of film and paper webs to form a scroll leaving an extending unwound end portion, thereafter attaching the end of the film to the paper adjacent to unwound end portion, re-opening the previously closed cartridge and inserting the scroll into a cartridge portion with the unwound end portion extending from the open cartridge, removing the spool from the re-opened cartridge, attaching the spool to the unwound end portion, and thereafter closing the cartridge and attaching the cartridge top and bottom portions together.

27. The method as claimed in claim 26 which further comprises the step of feeding the lengths of film and paper webs into adjacent tracks prior to interwinding them.

28. The method as claimed in claim 26 which further comprises the step of winding the scroll at a decreasing rate of speed.

29. The method as claimed in claim 27 which further comprises checking for the absence of film feed prior to feeding the paper web.

30. The method as claimed in claim 27 which further comprises cutting the film in the film track into a shorter length than the length of paper in the paper track.

References Cited

UNITED STATES PATENTS

| | | | |
|---|---|---|---|
| 3,138,081 | 6/1964 | Nerwin | 95—31 |
| 3,226,816 | 1/1966 | Wilson et al. | 53—118 X |
| 3,325,889 | 6/1967 | Meli et al. | |
| 3,364,552 | 1/1968 | Napor et al. | |

THOMAS H. EAGER, Primary Examiner

U.S. Cl. X.R.

29—208, 211; 53—118